(12) United States Patent
Tanaka et al.

(10) Patent No.: US 7,834,931 B2
(45) Date of Patent: Nov. 16, 2010

(54) APPARATUS AND METHOD FOR CAPTURING AN IMAGE USING A FLASH AND A SOLID-STATE IMAGE PICKUP DEVICE

(75) Inventors: Kazato Tanaka, Tokyo (JP); Takuya Chiba, Tokyo (JP); Naoki Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 284 days.

(21) Appl. No.: 11/659,234

(22) PCT Filed: Aug. 4, 2005

(86) PCT No.: PCT/JP2005/014341

§ 371 (c)(1),
(2), (4) Date: Jan. 7, 2009

(87) PCT Pub. No.: WO2006/013945

PCT Pub. Date: Feb. 9, 2006

(65) Prior Publication Data

US 2009/0213247 A1    Aug. 27, 2009

(30) Foreign Application Priority Data

Aug. 5, 2004 (JP) ............................. 2004-229662

(51) Int. Cl.
*H04N 5/222* (2006.01)
(52) U.S. Cl. .................................................. 348/371
(58) Field of Classification Search .................. 348/371
See application file for complete search history.

(56) References Cited

U.S. PATENT DOCUMENTS 6,069,659 A * 5/2000 Nakajima .................. 348/371
6,906,751 B1 6/2005 Norita et al.
6,961,093 B2 * 11/2005 Higuchi ..................... 348/371
7,428,378 B1 * 9/2008 Warpakowski Furlan .... 396/157
7,630,015 B2 * 12/2009 Okamura .................... 348/371
2001/0012063 A1 8/2001 Maeda (Continued)

FOREIGN PATENT DOCUMENTS

EP    1 148 712 A2    10/2001

(Continued)

OTHER PUBLICATIONS

Notification of Reasons for Refusal of Japanese Patent Application No. JP 2004-229662, (Nov. 10, 2009).

(Continued)

*Primary Examiner*—John M Villecco
*Assistant Examiner*—Kent Wang
(74) *Attorney, Agent, or Firm*—Finnegan, Henderson, Farabow, Garrett & Dunner, L.L.P.

(57) ABSTRACT

When flash photography is performed, an exposure time at a time of a preliminary light emission of a flash is set as short as possible so that the appropriate amount of light required for a main light emission of the flash can be accurately computed. Before the main light emission of the flash, an exposure operation prior to preliminary light emission and an exposure operation at the time of preliminary light emission are performed. After each of these exposures, the pixel signals of individual pixels are intermittently read out at predetermined pixel intervals. The brightness levels of images captured in the exposure operation prior to preliminary light emission and the exposure operation at the time of preliminary light emission are individually detected based on the signals. The amount of light required for the main light emission of the flash is computed based on a difference between the brightness levels.

13 Claims, 22 Drawing Sheets

U.S. PATENT DOCUMENTS

| | | | |
|---|---|---|---|
| 2001/0030700 A1 | 10/2001 | Mabuchi et al. | |
| 2002/0197071 A1 | 12/2002 | Hofer | |
| 2003/0007088 A1 | 1/2003 | Rantanen et al. | |
| 2003/0117519 A1* | 6/2003 | Wakabayashi | 348/364 |
| 2003/0122946 A1* | 7/2003 | Nishino et al. | 348/297 |
| 2003/0206235 A1 | 11/2003 | Suzuki | |
| 2004/0109082 A1* | 6/2004 | Yokonuma | 348/371 |
| 2004/0165169 A1 | 8/2004 | Teunissen et al. | |
| 2004/0169767 A1 | 9/2004 | Norita et al. | |
| 2005/0274909 A1 | 12/2005 | Teunissen et al. | |
| 2006/0119722 A1 | 6/2006 | Mabuchi et al. | |
| 2008/0165265 A1* | 7/2008 | Chiba et al. | 348/308 |

FOREIGN PATENT DOCUMENTS

| | | |
|---|---|---|
| EP | 1 263 215 A2 | 12/2002 |
| JP | 56-60418 | 5/1981 |
| JP | 05-061099 | 3/1993 |
| JP | 5-127215 | 5/1993 |
| JP | 6-141225 | 5/1994 |
| JP | 6-250255 | 9/1994 |
| JP | 7-50774 | 2/1995 |
| JP | 9-54364 | 2/1997 |
| JP | 10-032750 | 2/1998 |
| JP | 11-196332 | 7/1999 |
| JP | 11-237665 | 8/1999 |
| JP | 11-261899 | 9/1999 |
| JP | 2000-41186 | 2/2000 |
| JP | 2000-196951 | 7/2000 |
| JP | 2000-278597 | 10/2000 |
| JP | 2002-142151 | 5/2002 |
| JP | 2002-247443 | 8/2002 |
| JP | 2003-32694 | 1/2003 |
| JP | 2003-333419 | 11/2003 |
| JP | 2004-147278 | 5/2004 |

OTHER PUBLICATIONS

"Recent Trend of Solid-State Image Sensing Devices," Broadcasting Technology, vol. 39, No. 8, pp. 703-708, (Aug. 1, 1986).

Hara, M., "Knowledge of recent Imaging Devices," Electronics Life Separate Volume, Recent Video, Japan Broadcast Publication Association, pp. 96-99, (Jun. 20, 1985).

Decision of the Declining of Amendment, Japanese Patent Application No. JP 2004-229662 (Feb. 1, 2010) (11 pages).

* cited by examiner

FIG. 15
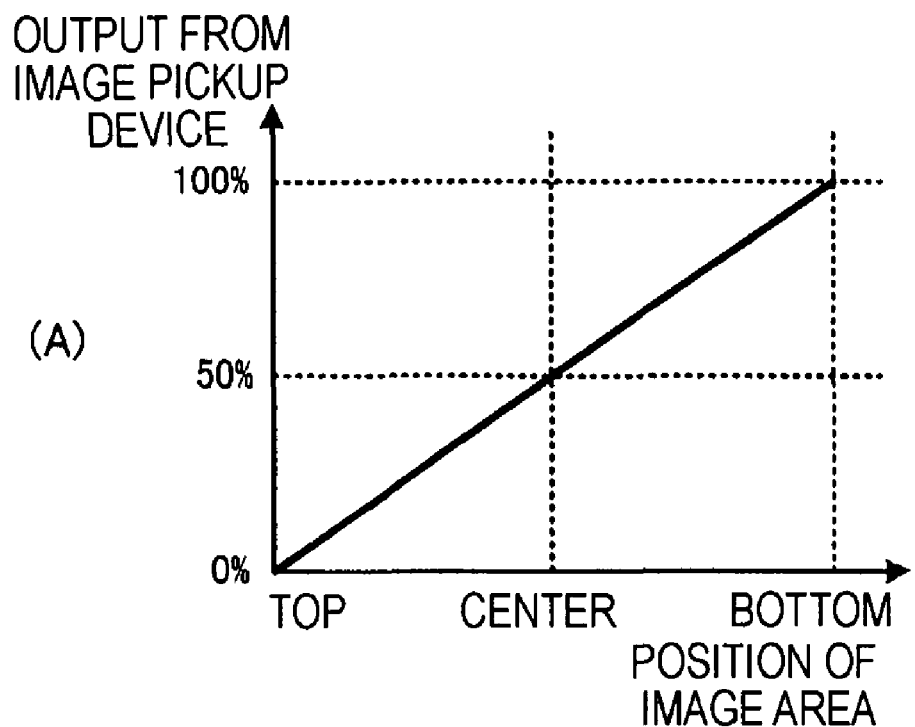
(A)
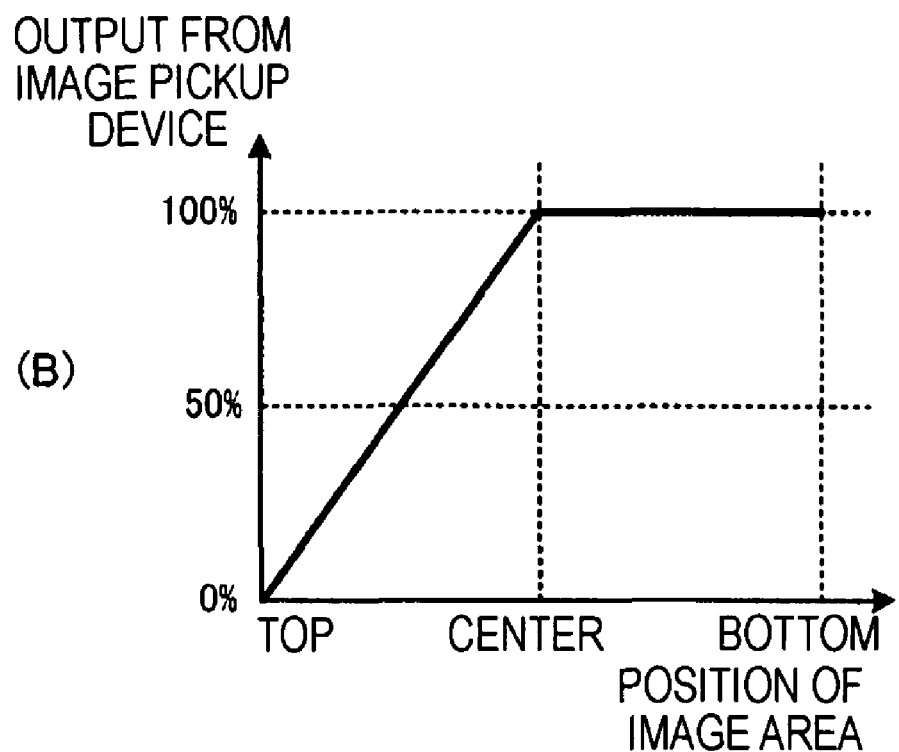
(B)

FIG. 17
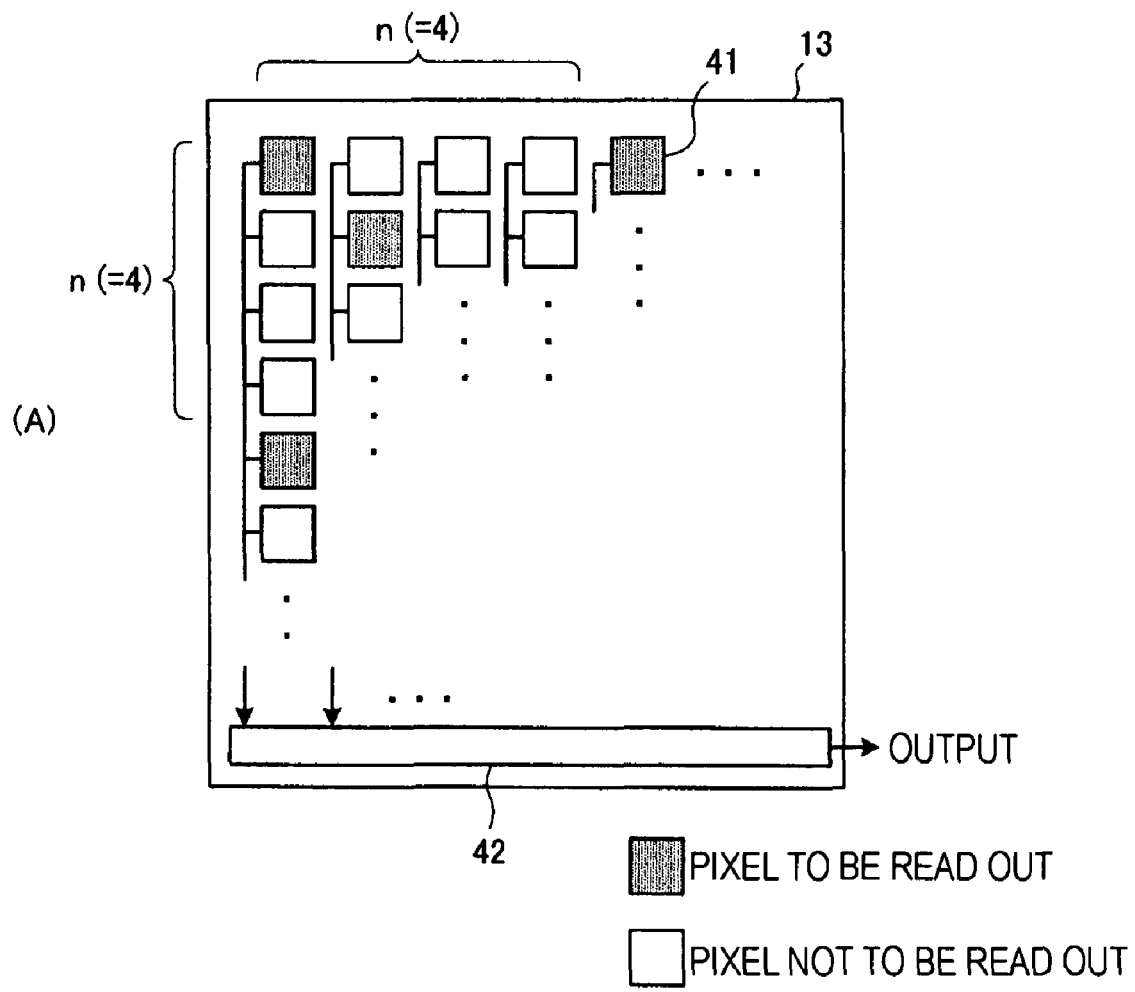
(A)
n (=4), n (=4), 41, 13, 42, OUTPUT
▨ PIXEL TO BE READ OUT
☐ PIXEL NOT TO BE READ OUT
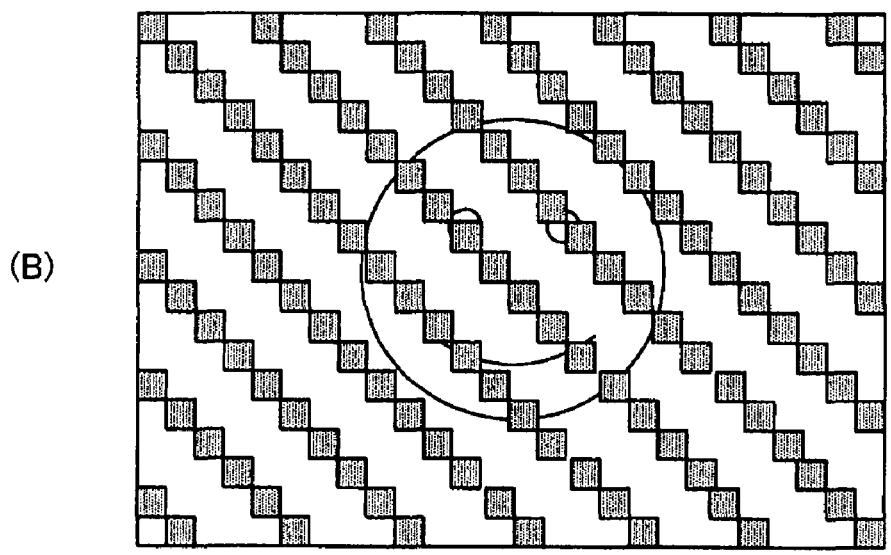
(B)

FIG. 20
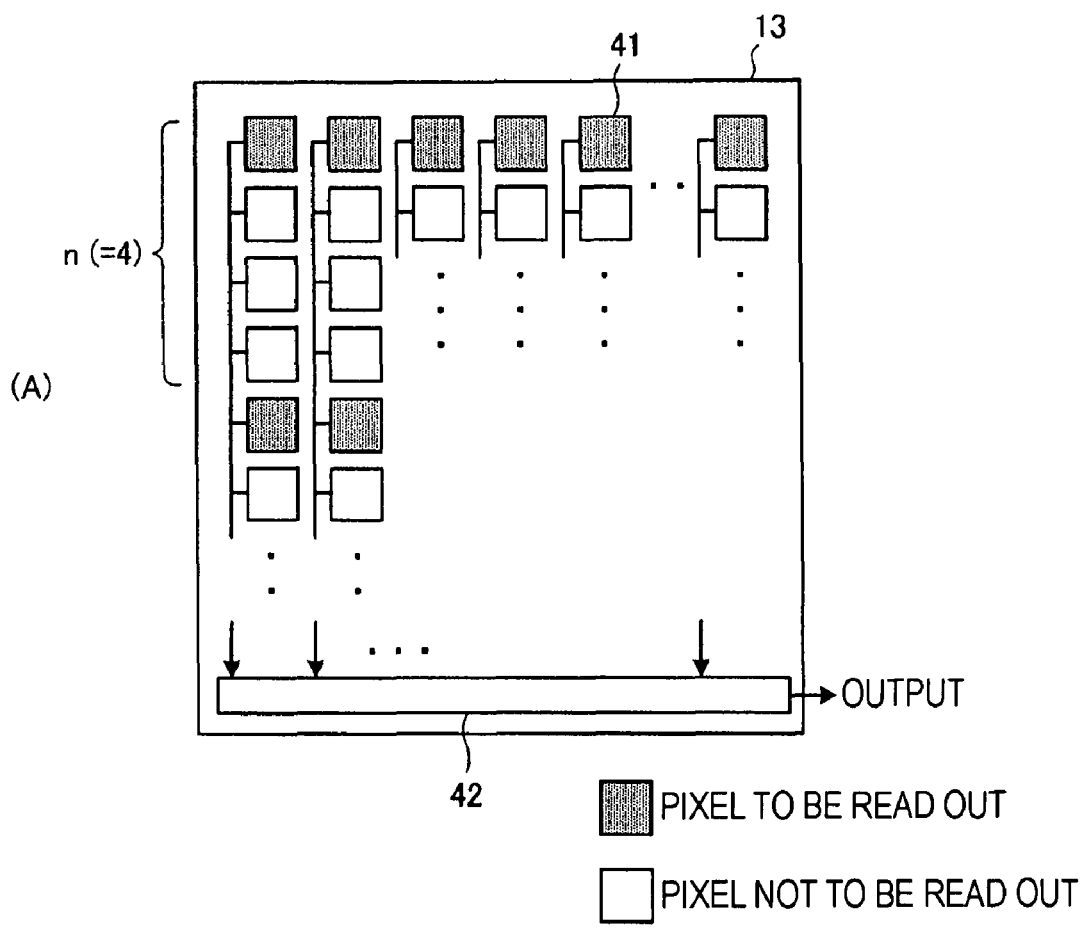
(A)
| | PIXEL TO BE READ OUT |
| | PIXEL NOT TO BE READ OUT |
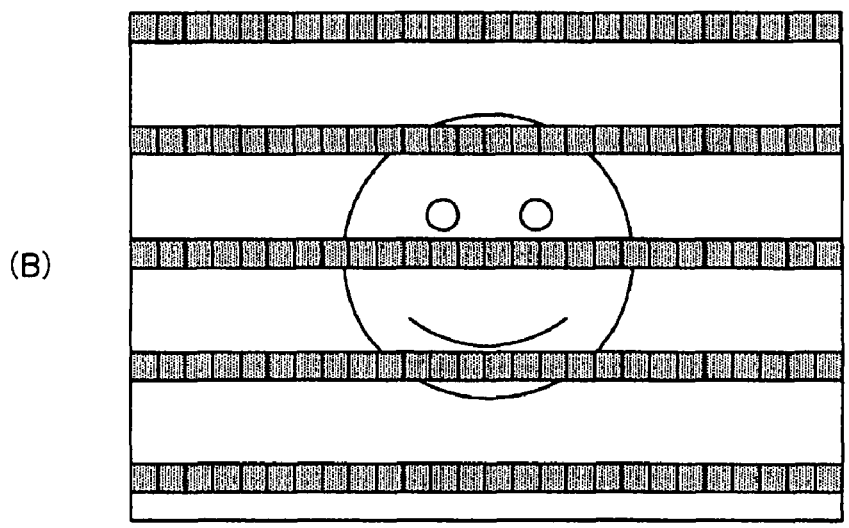
(B)

▭ PIXEL TO BE READ OUT

APPARATUS AND METHOD FOR CAPTURING AN IMAGE USING A FLASH AND A SOLID-STATE IMAGE PICKUP DEVICE

TECHNICAL FIELD

The present invention relates to image pickup apparatuses, image pickup methods, and image pickup control programs for capturing an image using a solid-state image pickup device in which the pixel signals of individual pixels can be randomly accessed, and, more particularly, to an image pickup apparatus, an image pickup method, and an image pickup control program capable of capturing an image using a flash.

BACKGROUND ART

Image pickup apparatuses fire a flash so as to adjust the amount of light when capturing an image of a subject under low illuminance conditions. Some image pickup apparatuses that capture an image using a solid-state image pickup device have a function of performing preliminary light emission using a flash and detecting and analyzing the amount of light reflected from a subject to calculate the appropriate amount of light required for main light emission.

CCD (Charge Coupled Device) image sensors have been mostly used as an image pickup device for an image pickup device. However, as the number of pixels included in a solid-state image pickup device becomes increased, CMOS (Complementary Metal Oxide Semiconductor) image sensors are currently attracting attention. A CMOS image sensor has features in which pixel signals can be randomly accessed and can be rapidly read out compared with a CCD image sensor and it has high sensitivity and consumes low power.

However, in known image pickup apparatuses using a CMOS image sensor, reflected light caused by preliminary light emission of a flash is transmitted to only a part of the whole area of a solid-state image pickup device, since exposure times of individual pixels are different from each other. Accordingly, it is difficult to accurately calculate the amount of light required for main light emission. In order to overcome this difficulty, there is an image pickup apparatus in which a part of the whole area of a solid-state image pickup device is set as a metering area and preliminary light emission is performed during the electric charge storage time of photoelectric conversion elements included in the metering area to allow the metering area to accurately receive reflected light caused by the preliminary light emission (see, for example, Japanese Unexamined Patent Application Publication No. 2000-196951 (paragraphs [0018] to [0026] and FIG. 2).

DISCLOSURE OF INVENTION

However, in such an image pickup apparatus disclosed in Japanese Unexamined Patent Application Publication No. 2000-196951, a long exposure time must be set so as to allow the photoelectric conversion elements included in the metering area to simultaneously receive the reflected light caused by the preliminary light emission. Accordingly, if the preliminary light emission is performed when external light is strong, the amount of light input into a certain area of the CMOS image sensor may exceed the dynamic range thereof. Consequently, the amount of light actually received by the area of the CMOS image sensor cannot be detected, and it is therefore difficult to precisely calculate the amount of light required for main light emission.

The present invention has been made in view of the above-described background. An object of the present invention is to provide an image pickup apparatus capable of precisely computing the appropriate amount of light required for main light emission regardless of the intensity of external light by shortening the exposure time of preliminary light emission as much as possible in flash photography.

Furthermore, another object of the present invention is to provide an image pickup method capable of precisely computing the appropriate amount of light required for main light emission regardless of the intensity of external light by shortening the exposure time of preliminary light emission as much as possible in flash photography.

Still furthermore, another object of the present invention is to provide an image pickup control program capable of precisely computing the appropriate amount of light required for main light emission regardless of the intensity of external light by shortening the exposure time of preliminary light emission as much as possible in flash photography.

According to an embodiment of the present invention, there is provided an image pickup apparatus for capturing an image using a solid-state image pickup device in which the pixel signals of individual pixels can be randomly accessed. The image pickup apparatus includes: a flash for exposing a subject to light; detecting means for detecting the brightness level of a captured image from an image signal obtained by the solid-state image pickup device; and controlling means for causing the flash to perform preliminary light emission prior to the main light emission of the flash, causing the solid-state image pickup device to capture an image at the time of the preliminary light emission, causing the detecting means to detect the brightness level of the image captured at the time of the preliminary light emission on the basis of the signal of the captured image, and computing the amount of light required for the main light emission of the flash on the basis of the detected brightness level at the time of the preliminary light emission. The controlling means intermittently reads out the pixel signals of individual pixels at predetermined pixel intervals after causing the solid-state image pickup device to simultaneously start the exposure operations of all pixels included therein at the time of the preliminary light emission, and then transmits the read out pixel signals to the detecting means.

In such an image pickup apparatus, the preliminary light emission of a flash is performed prior to the main light emission thereof so as to capture an image. The amount of light required for the main light emission of the flash is computed on the basis of the detection result of the brightness level of the captured image. When the preliminary light emission is performed, after the exposure operations of all pixels included in a solid-state image pickup device have been simultaneously started, the pixel signals of individual pixels are intermittently read out at predetermined pixel intervals. Consequently, the effect of the preliminary light emission is applied to the whole image area of the solid-state image pickup device. In addition, the exposure time of the solid-state image pickup device at the time of the preliminary light emission is shortened, and the detected amount of the component of external light is decreased.

According to an embodiment of the present invention, there is provided an image pickup method of capturing an image by firing a flash using a solid-sate image pickup device in which the pixel signals of individual pixels can be randomly accessed. The image pickup method includes: an image capturing step at the time of preliminary light emission of causing the flash to perform preliminary light emission prior to the main light emission of the flash, and causing the solid-state image pickup device to capture an image at the time of the preliminary light emission; a detecting step at the time of preliminary light emission of causing detecting means to detect the brightness level of the image captured at the time of the preliminary light emission; and a computing step of causing computing means to compute the amount of light required for the main light emission of the flash on the basis of the brightness level detected at the time of the preliminary light emission. In the image capturing step at the time of preliminary light emission, after the exposure operations of all pixels included in the solid-state image pickup device have been simultaneously started, the pixel signals of individual pixels are intermittently read out at predetermined pixel intervals.

In such an image pickup method, the preliminary light emission of a flash is performed prior to the main light emission thereof so as to capture an image. The amount of light required for the main light emission of the flash is computed on the basis of the detection result of the brightness level of the captured image. When the preliminary light emission is performed, after the exposure operations of all pixels included in a solid-state image pickup device have been simultaneously started, the pixel signals of individual pixels are intermittently read out at predetermined pixel intervals. Consequently, the effect of the preliminary light emission is applied to the whole image area of the solid-state image pickup device. In addition, the exposure time of the solid-state image pickup device at the time of the preliminary light emission is shortened, and the detected amount of the component of external light is decreased.

BRIEF DESCRIPTION OF THE DRAWINGS

FIG. 15 is a graph showing an example of detection of a detection value prior to preliminary light emission acquired by using the flash photography sequence shown in FIG. 13.

FIG. 17 is a diagram showing an exemplary intermittent pixel signal read-out method according to an embodiment which is used for an exposure operation prior to preliminary light emission and an exposure operation at the time of preliminary light emission.

FIG. 20 is a diagram showing another exemplary intermittent pixel signal read-out method according to an embodiment which is used for the exposure operation prior to preliminary light emission and the exposure operation at the time of preliminary light emission.

BEST MODE FOR CARRYING OUT THE INVENTION

An embodiment of the present invention will be described in detail with reference to the accompanying drawings.

Figure 1:
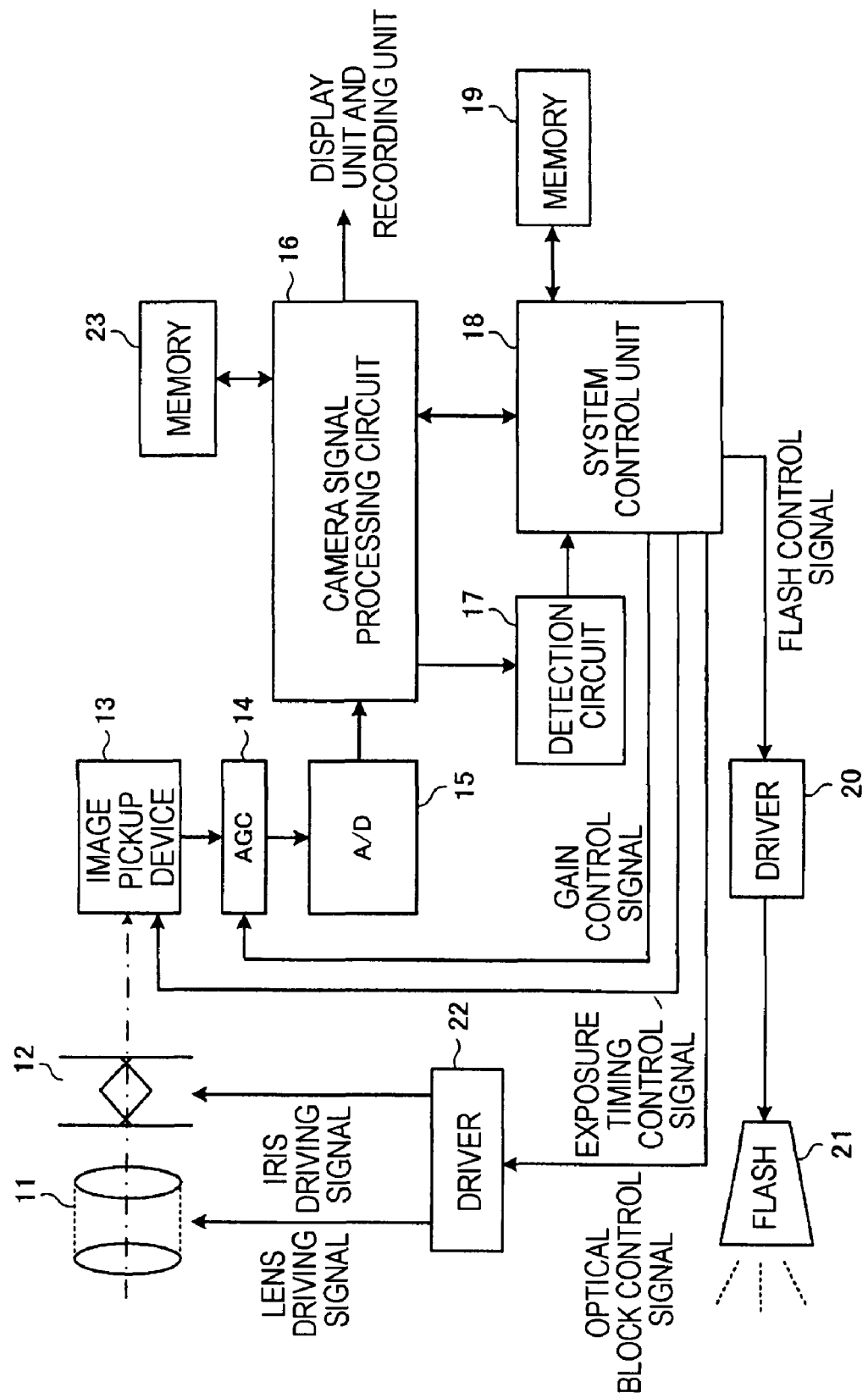
FIG. 1 is a diagram showing the essential configuration of an image pickup apparatus according to an embodiment of the present invention.

FIG. 1 is a diagram showing the essential configuration of an image pickup apparatus according to an embodiment of the present invention.

The image pickup apparatus shown in FIG. 1 is, for example, a digital still camera or a digital video camera capable of capturing a still image, and is provided with a lens 11, an iris 12, an image pickup device 13, an AGC (Auto Gain Control) circuit 14, an A/D conversion circuit 15, a camera signal processing circuit 16, a detection circuit 17, a system control unit 18, a memory 19, a driver 20, a flash 21, a driver 22, and a memory 23.

The lens 11 focuses reflected light incident from a subject onto the light-receiving surface of the image pickup device 13. The iris 12 changes the aperture thereof so that the amount of light received through the lens 11 can be suitable for the sensitivity of the image pickup device 13, and, in addition, has a shutter function. The image pickup device 13 includes a plurality of pixels on each of which an R, G, or B color filter is disposed, and photoelectrically converts light transmitted through the lens 11 to the pixels into analog image signals (electric charges). In addition, the image pickup device 13 is configured with an XY address type image sensor such as a CMOS image sensor in which the exposure operations and read-out operations of a plurality of pixels are individually performed at different times.

The AGC circuit 14 amplifies an image signal generated by the image pickup device 13. The A/D conversion circuit 15 converts the analog image signal amplified by the AGC circuit 14 into a digital image signal. The camera signal processing circuit 16 performs various pieces of signal processing upon the digital image signal converted by the A/D conversion circuit 15, and is provided with, for example, a white balance control circuit, a YC separation circuit, a filter circuit, an aperture controller, a gamma correction circuit, etc. (not shown). Although not shown in this drawing, the image signal output from the camera signal processing circuit 16 is transmitted to, for example, a display unit for displaying a captured image on a monitor, and a recording unit for encoding the image signal into a predetermined data format and recording data on the captured image onto a recording medium such as memory card. The detection circuit 17 detects the brightness level and color distribution of the area of the captured image on the basis of the image signal processed by the camera signal processing circuit 16. An integrated value of brightness signals of individual pixels included in the area of the captured image is used as a detection value representing a brightness level.

The system control unit 18 is configured with, for example, a micro-computer, and centrally controls individual units included in this image pickup apparatus on the basis of the brightness level and color distribution detected by the detection circuit 17 and the image signal processed by the camera signal processing circuit 16. For example, the system control unit 18 computes an exposure timing control signal for controlling an exposure operation and a read-out operation which are performed on each pixel included in the image pickup device 13, a gain control signal for controlling the gain of the AGC circuit 14, an optical block control signal for controlling the focus of the lens 11 and the aperture of the iris 12 via the driver 22, a flash control signal for controlling the firing operation of the flash 21 via the driver 20, etc., and outputs the computed control signals. The memory 19 stores the control data computed by the system control unit 18.

The driver 20 drives the flash 21 in accordance with the flash control signal computed by the system control unit 18 when flash photography is performed. The flash 21 is fired in accordance with a driving signal transmitted from the driver 20. The driver 22 drives the lens 11 and the iris 12 in accordance with the lens control signal computed by the system control unit 18. The memory 23 temporarily stores the image signal processed or being processed by the camera signal processing circuit 16.

The basic operation of this image pickup apparatus when a still image is captured is as follows.

First, before a user performs an image capturing operation, light received by the image pickup device 13 is photoelectrically converted into image signals, and the image signals are sequentially provided for the AGC circuit 14. The image signals are amplified by the AGC circuit 14 as appropriate, and are converted into digital signals by the A/D conversion circuit 15, and undergo various pieces of image quality correction processing in the camera signal processing circuit 16. The processed image signals are output to the display unit (not shown) to display a camera-through image on a monitor. Consequently, the user can adjust a field angle by checking the monitor.

In the above-described condition, if the user presses a release button (not shown), the system control unit 18 outputs control signals to the driver 22 and the image pickup device 13 so as to operate a shutter, whereby image signals of one frame are output from the image pickup device 13. At that time, the system control unit 18 outputs control signals to the lens 11, the iris 12, the image pickup device 13, and the AGC circuit 14 on the basis of the results of various pieces of processing performed by the camera signal processing circuit 16 and the detection result of the detection circuit 17 so as to appropriately control a focus, an exposure time, and the amount of light exposure.

The camera signal processing circuit 16 performs image quality correction processing upon the image signals of one frame provided via the AGC circuit 14 and the A/D conversion circuit 15 from the image pickup device 13, and outputs the processed image signals to the recording unit (not shown). Consequently, the image signals of one frame are encoded to generate a still image data file, and the generated data file is recorded onto a recording medium such as a memory card.

In addition, this image pickup apparatus can automatically fire the flash 21 in accordance with, for example, a user's operation or on the basis of the detection result of the detection circuit 17 at the time of image capturing. As described later, when flash photography is performed, preliminary light emission is performed immediately before the main light emission of the flash 21 under the control of the system control unit 18. The image signals of a captured image acquired from the preliminary light emission are detected by the detection circuit 17, and the amount of light required for the main light emission of the flash 21 is controlled on the basis of the detection results so that an appropriate captured image can be obtained.

In the image pickup device 13 according to this embodiment, individual pixels corresponding to photoelectric conversion elements can be randomly accessed. In the following, the description of this embodiment will be made using a CMOS image sensor as the image pickup device 13, and contrasting the CMOS image sensor with a widely used CCD image sensor when appropriate.

First, the basic configuration of the image pickup device 13 will be described.

Figure 2:
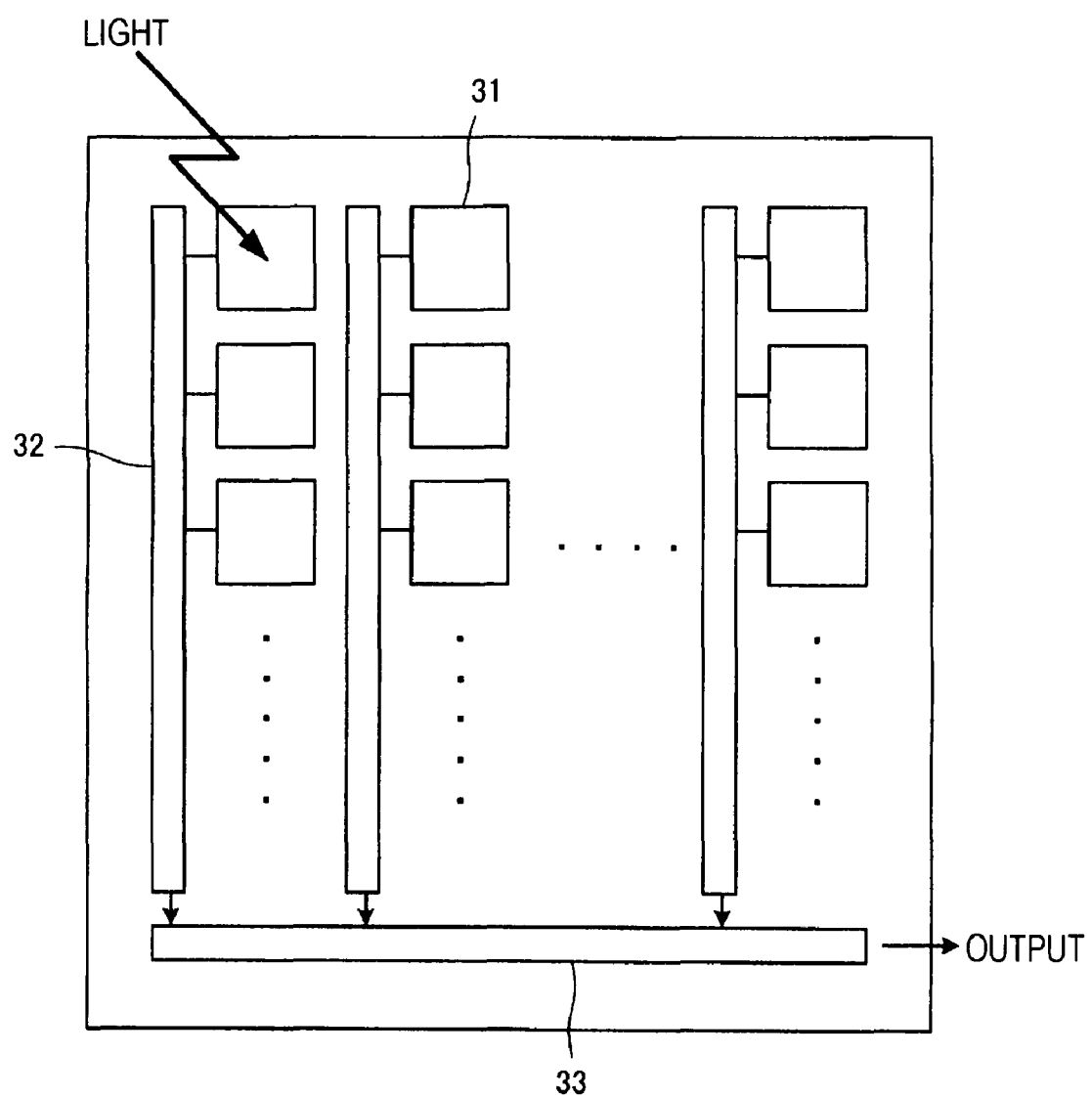
FIG. 2 is a schematic diagram showing the configuration of a CCD image sensor.
Figure 3:
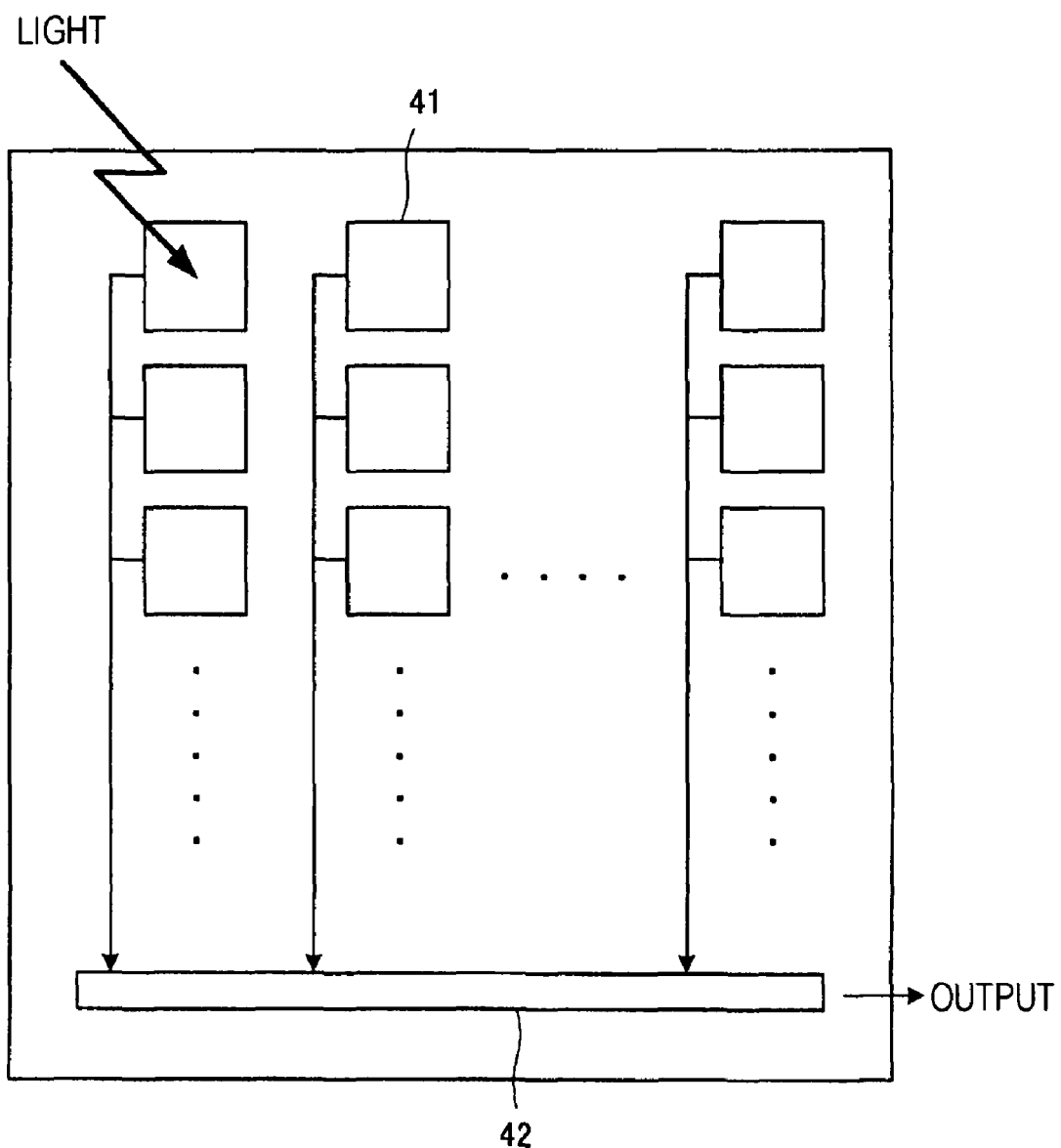
FIG. 3 is a schematic diagram showing the configuration of a CMOS image sensor.

FIG. 2 is a schematic diagram showing the configuration of a CCD image sensor. FIG. 3 is a schematic diagram showing the configuration of a CMOS image sensor according to this embodiment.

As shown in FIG. 2, the CCD image sensor is provided with a plurality of light-receiving units 31 that are two-dimensionally arranged in a matrix form, vertical transfer registers 32, the number of which being the same as that of columns of the light-receiving units 31, and a horizontal transfer register 33. Each of the light-receiving units 31 photoelectrically converts incident light into an analog image signal (electric charge) to generate a pixel signal. The vertical transfer registers 32 vertically transfer photoelectrically converted pixel signals output from individual pixels in units of pixels (rows). The vertical transfer registers 32 horizontally transfer the pixel signals included in individual rows transferred from the vertical transfer registers 32 in units of pixels.

When the CCD image sensor is exposed to light, light incident on each of the light-receiving units 31 is photoelectrically converted into an electric charge. Each of the light-receiving units 31 stores an electric charge corresponding to the amount of incident light. When an electric charge transfer instruction signal is provided for the CCD image sensor, the electric charges stored in all of the light-receiving units 31 are simultaneously transferred to the corresponding vertical transfer registers 32. The electric charges transferred to the vertical transfer registers 32 are vertically transferred to the horizontal transfer register 33 in units of pixels (rows). The pixel signals included in individual rows which have been transferred to the horizontal transfer register 33 are horizontally transferred and output in units of pixels. At that time, since the vertical transfer registers 32 and the horizontal transfer register 33 are light-shielded, the amounts of electric charge transferred to these registers are kept constant.

On the other hand, as shown in FIG. 3, the CMOS image sensor is provided with a plurality of light-receiving units 41 that are two-dimensionally arranged in a matrix form and a column 42 that electrically connects the light-receiving units 41 included in the same column and horizontally transfers electric charges transferred from the light-receiving units 41 included in the same column in units of pixels. The CMOS image sensor does not have components corresponding to the vertical transfer registers 32 included in the CCD image sensor. Accordingly, the area of each of the light-receiving units 41 can be enlarged compared with that of each of the light-receiving units 31 included in the CCD image sensor, whereby the dynamic range thereof can be enhanced and the sensitivity thereof can be improved. Furthermore, the CMOS image sensor can be configured to select a pixel of an arbitrary address and read out the selected pixel.

With increasing number of pixels included in an image pickup device, pixel pitch decreases. Even in this case, however, a configuration that realizes a relatively wide dynamic range of pixel signals, and a configuration allowing only necessary pixel signals to be arbitrarily read out in an image pickup device having many pixels are required. A CMOS image sensor has the advantage of being able to achieve the above-described configurations. In contrast, pixels included in the same column cannot be simultaneously read out in a CMOS image sensor, and an exposure operation and a read-out operation which are performed on each pixel are therefore complicated as described in the following.

Figure 4:
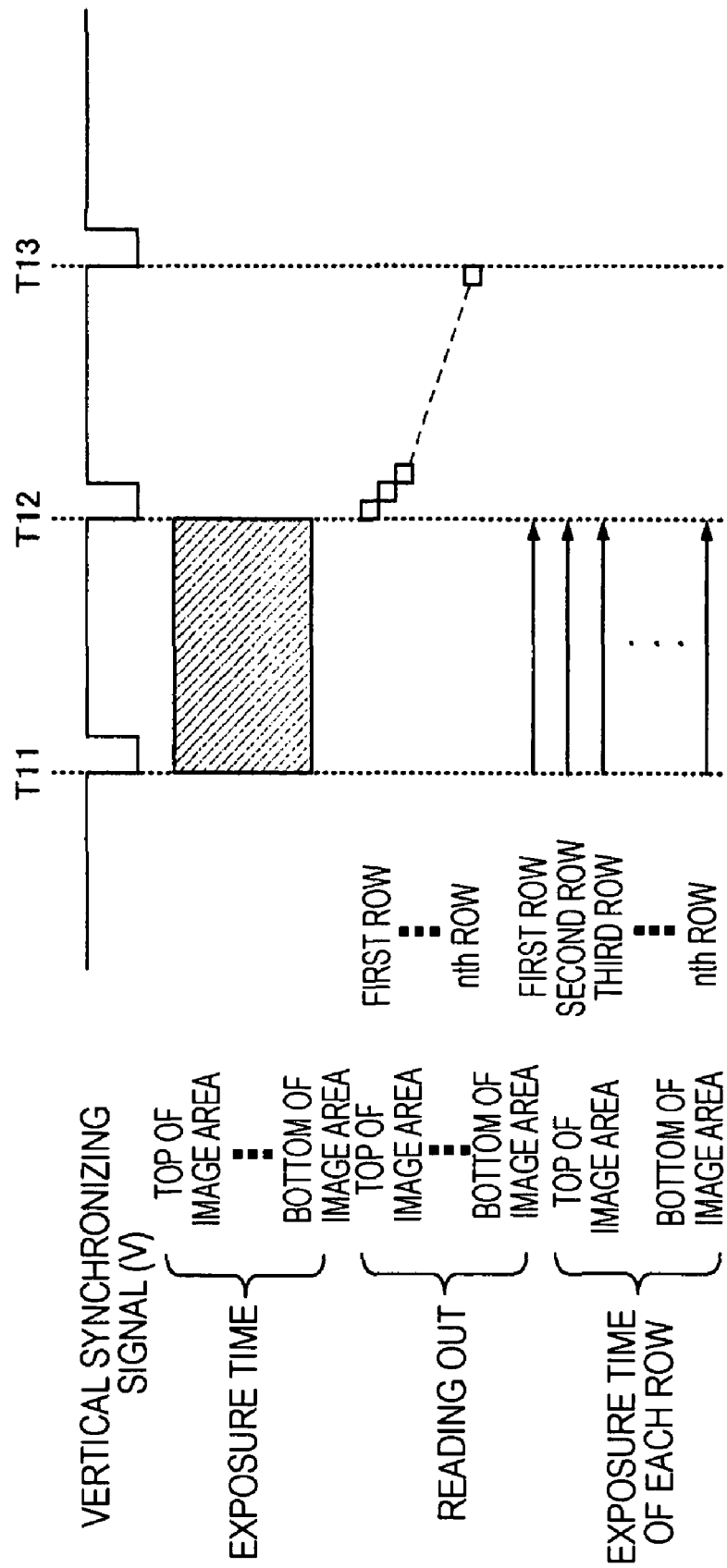
FIG. 4 is a time chart showing the operation of a CCD image sensor.
Figure 5:
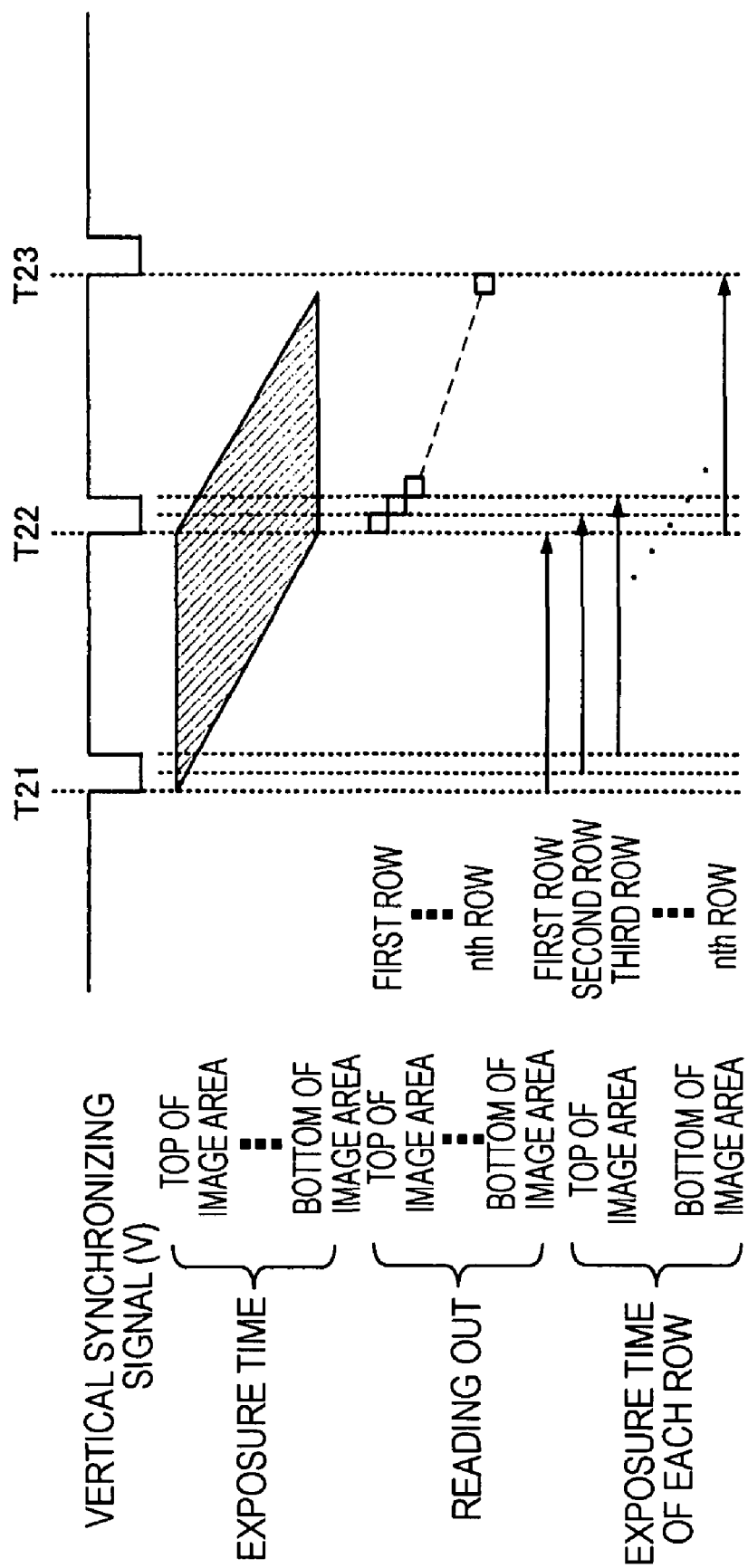
FIG. 5 is a time chart showing the operation of a CMOS image sensor.

FIG. 4 is a time chart showing the operation of a CCD image sensor. FIG. 5 is a time chart showing the operation of a CMOS image sensor.

In the CCD image sensor, as shown in FIG. 4, the exposure operations of all pixels are started at a time T11, and then the electric charges of all the pixels are individually transferred to the vertical transfer registers 32 at a time T12, whereby the exposure operations of all the pixels can be simultaneously performed. The stored electric charges are sequentially transferred to the horizontal transfer register 33 row by row starting from a first row during the period between the time T12 and a time T13.

On the other hand, in the CMOS image sensor, while a pixel signal is read out from a certain pixel, other pixels store electric charges under the effect of external light, since the CMOS image sensor does not have components corresponding to the vertical transfer registers 32. Accordingly, as shown in FIG. 5, the exposure operation of each pixel included in the CMOS image sensor is required to be controlled taking the electric charge read-out operation of each of the light-receiving units 41 into consideration. In this example, a pixel signal read-out timing is shifted row by row from the top to the bottom of an image area in a single vertical synchronization period between a time T22 and a time T23. Accordingly, in order to make exposure times of all pixels equal, an exposure start timing is also shifted row by row starting from a top row in a single precedent vertical synchronization period between a time T21 and the time T22.

Next, a flash photography operation will be described.

Figure 6:
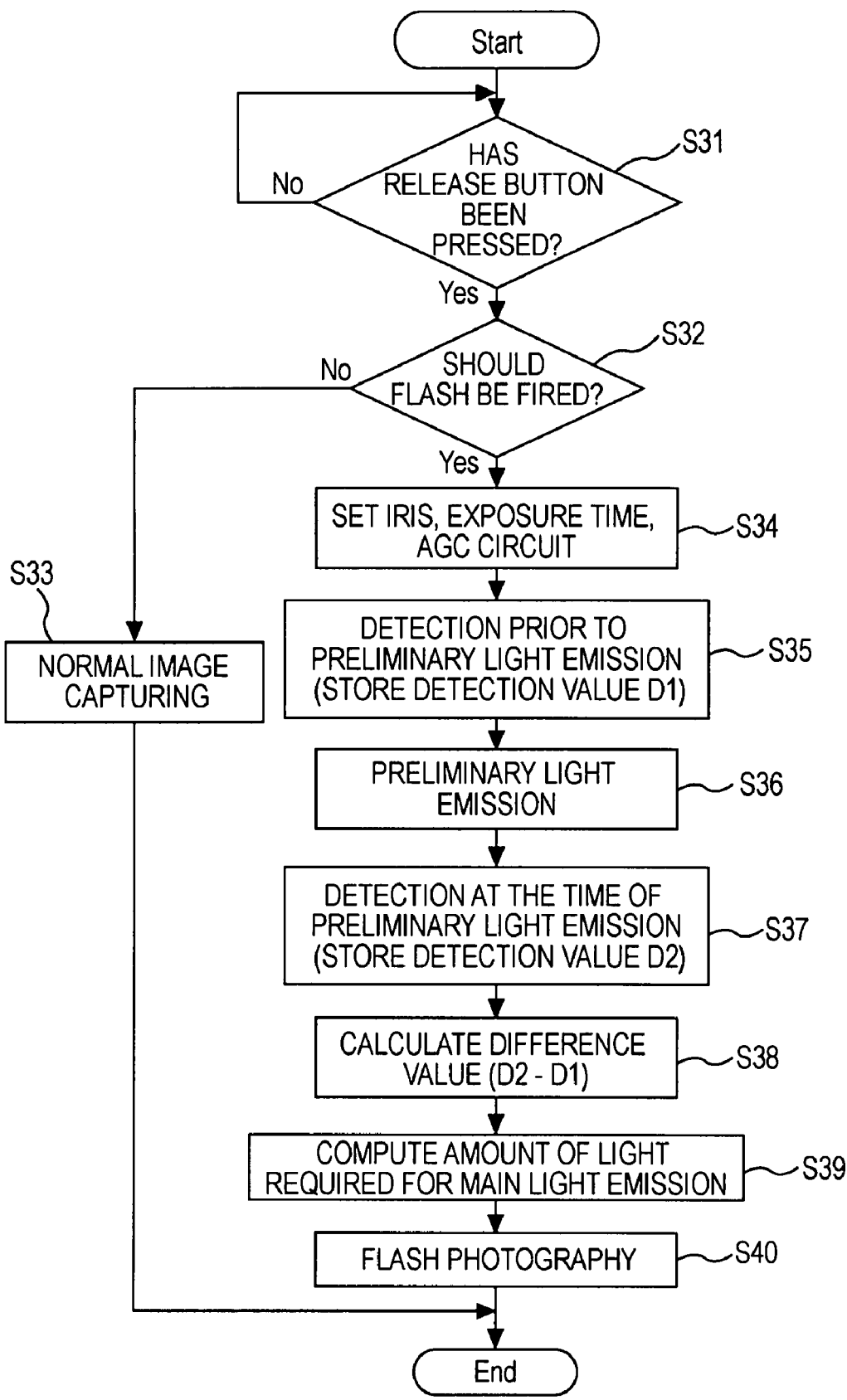
FIG. 6 is a diagram showing the basic control flow of flash photography.

FIG. 6 is a diagram showing the basic control flow of flash photography.

In a still image capturing mode, when a shutter release button is pressed (step S31), the process proceeds from step S32. Here, if an operation mode in which a flash is automatically fired is set, the detection circuit 17 detects the integrated value of brightness signals included in image signals acquired by the image pickup device 13. The system control unit 18 detects the intensity of external light on the basis of the integrated value of the brightness signals, and determines whether the flash should be fired on the basis of the result of the detection (step S32). If it is determined that the external light is bright, the process proceeds to step S33. In step S33, normal image capturing in which the flash 21 is not fired is performed, and then the process ends. On the other hand, if it is determined that the external light is dark in step S32, the process proceeds to step S34 in which flash photography is performed. If an operation mode in which flash photography is performed regardless of the intensity of external light is set, the process proceeds to step S34 regardless of the determination result of step S32, and then flash photography is performed.

When flash photography is performed, first, the aperture and open time of the iris 12, the exposure time (shutter speed) of the image pickup device 13, and the gain of the AGC circuit 14 are set (step S34). It is desirable that the aperture of the iris 12 be set so as not to allow the amount of light incident from a nearby subject to exceed the dynamic range of the image pickup device 13 when the preliminary light emission of the flash 21 is performed. The preliminary light emission is performed so as to compute the amount of light required for main light emission. If the amount of light incident on the image pickup device 13 exceeds the dynamic range thereof, a distorted (saturated) image signal is acquired. Accordingly, the amount of light required for main light emission cannot be accurately computed. Furthermore, it is desirable that the exposure time of the image pickup device 13 be set as short as possible. If the exposure time becomes long, the effect of external light is increased, and the dynamic range used to detect the amount of light caused by the preliminary light emission is degraded. Consequently, the accuracy of the computation of the amount of light required for main light emission is decreased. Still furthermore, it is desirable that the gain of the AGC circuit 14 be set low so as to reduce the effect of image signal noise.

Subsequently, the image pickup device 13 performs an exposure operation and a read-out operation without causing the flash 21 to be fired before preliminary light emission is performed in the state in which the above-described aperture, exposure time, and gain settings are maintained. Subsequently, the detection circuit 17 detects the integrated value of brightness signals included in image signals acquired by the image pickup device 13, and stores the integrated value in the memory 19 as a detection value prior to preliminary light emission (D1) (step S35). This detection value prior to preliminary light emission D1 represents a detection value acquired under only external light without preliminary light emission.

Subsequently, preliminary light emission is performed by the flash 21 in accordance with the predetermined amount of light in the state in which the above-described aperture, exposure time, and gain settings are maintained (step S36). Subsequently, the image pickup device 13 performs an exposure operation and a read-out operation. The detection circuit 17 detects the integrated value of brightness signals included in the image signals acquired by the image pickup device 13, and stores the integrated value in the memory 19 as a detection value at the time of preliminary light emission (D2) (step S37). This detection value at the time of preliminary light emission D2 represents a detection value acquired under light including external light and light caused by the preliminary light emission.

Subsequently, the system control unit 18 reads out the detection value at the time of preliminary light emission D2 and the detection value prior to preliminary light emission D1 from the memory 19, and computes a difference detection value by subtracting the detection value prior to preliminary light emission D1 from the detection value at the time of preliminary light emission D2 (step S38). The difference detection value represents a detection value acquired under only the light caused by the preliminary light emission except for the external light. Subsequently, the system control unit 18 computes the amount of light required for main light emission to be performed by the flash 21 on the basis of the difference detection value (step S39). The flash 21 is fired in accordance with the computed amount of light, whereby flash photography is performed (step S40).

Thus, in an image pickup apparatus according to this embodiment, the preliminary light emission for flash photography has two stages. In one stage, the image signal read-out operation is performed in the state in which the flash is not fired, so that the detection value prior to preliminary light emission D1 is acquired. In another stage, the image signal read-out operation is performed after the flash has been fired, so that the detection value at the time of preliminary light emission D2 is acquired. The effect of external light is removed by subtracting the detection value prior to preliminary light emission D1 from the detection value at the time of preliminary light emission D2, whereby the amount of light required for main light emission can be accurately computed. Here, it is desirable that a time taken by the image pickup device 13 to perform the exposure operation prior to the preliminary light emission in step S35 and a time taken by the image pickup device 13 to perform the exposure operation at the time of the preliminary light emission in step S37 be as short as possible. Although flash photography is generally performed under low illuminance conditions, there is almost always some external light. For example, flash photography is also performed so as to highlight a backlit dark subject. Thus, in the case of strong external light, a suitable detection value, in particular, the suitable detection value at the time of preliminary light emission D2 cannot be acquired under the effect of the strong external light, and therefore a suitable difference detection value may not be acquired as described in the following with reference to FIGS. 7 to 9.

Figure 7:
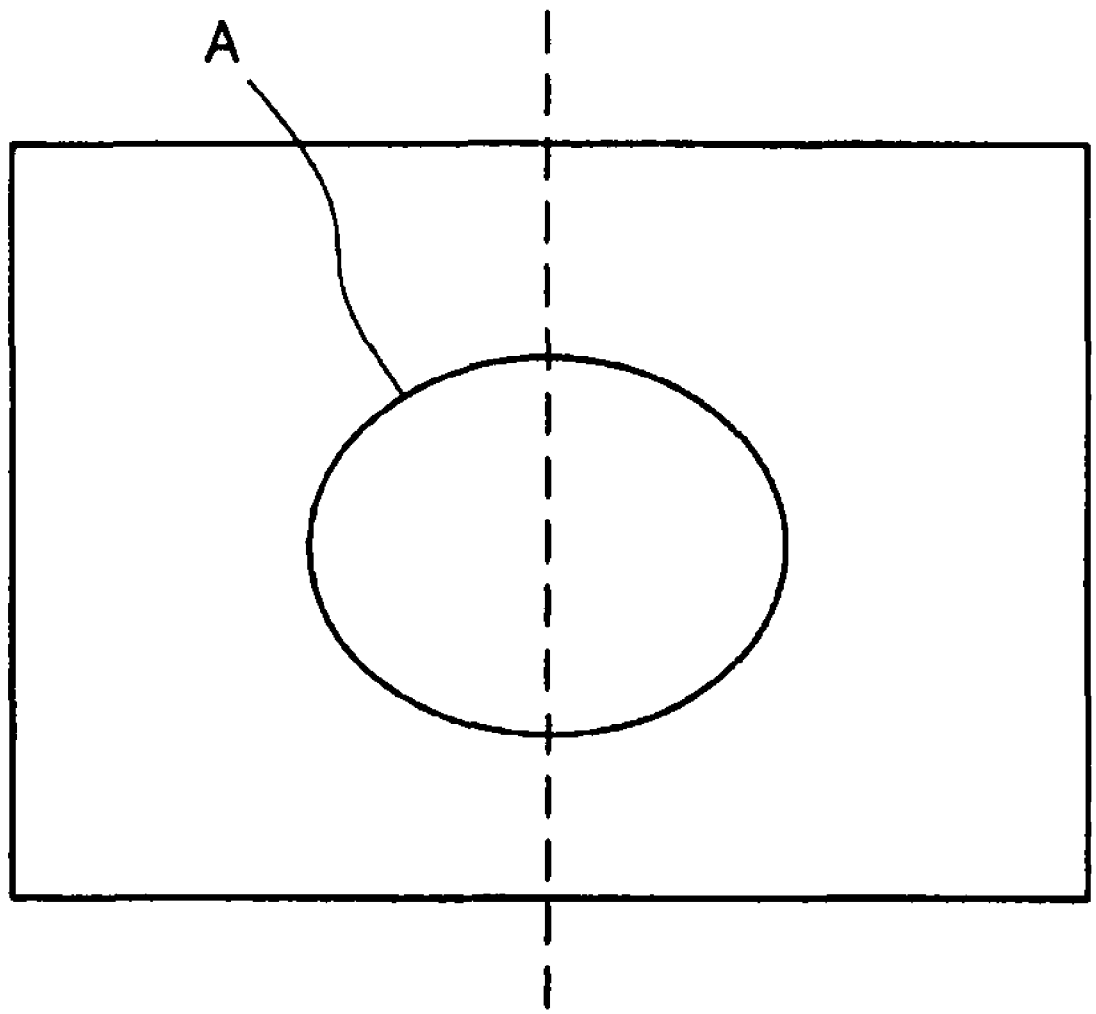
FIG. 7 is a diagram showing an exemplary captured image.
Figure 8:
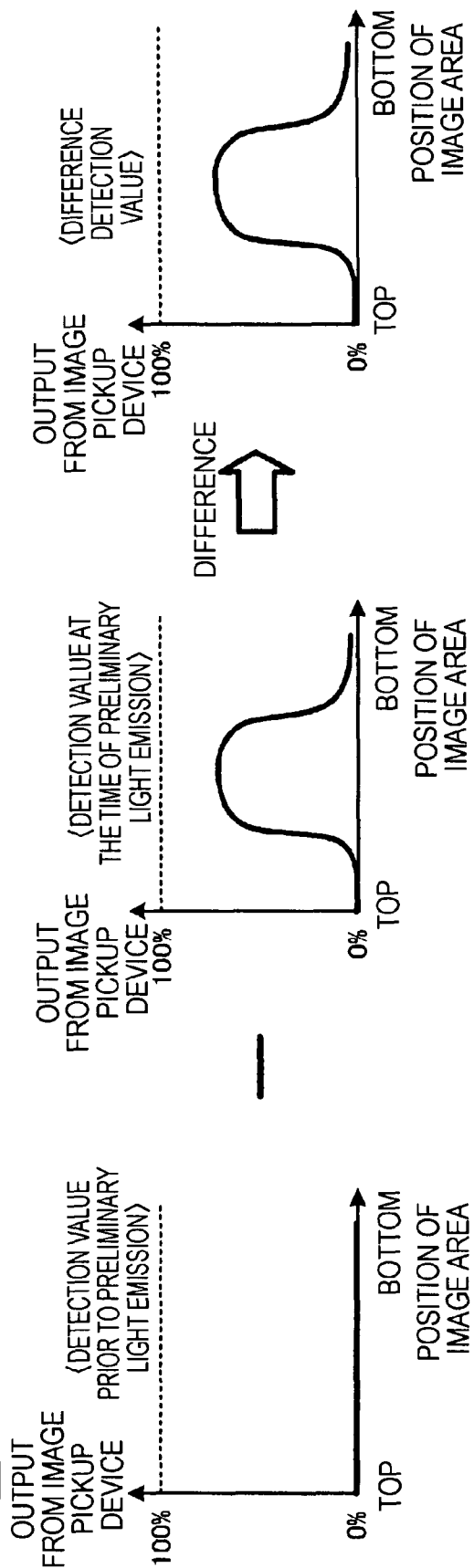
FIG. 8 is a diagram showing an exemplary computation of a difference detection value when there is no external light.
Figure 9:
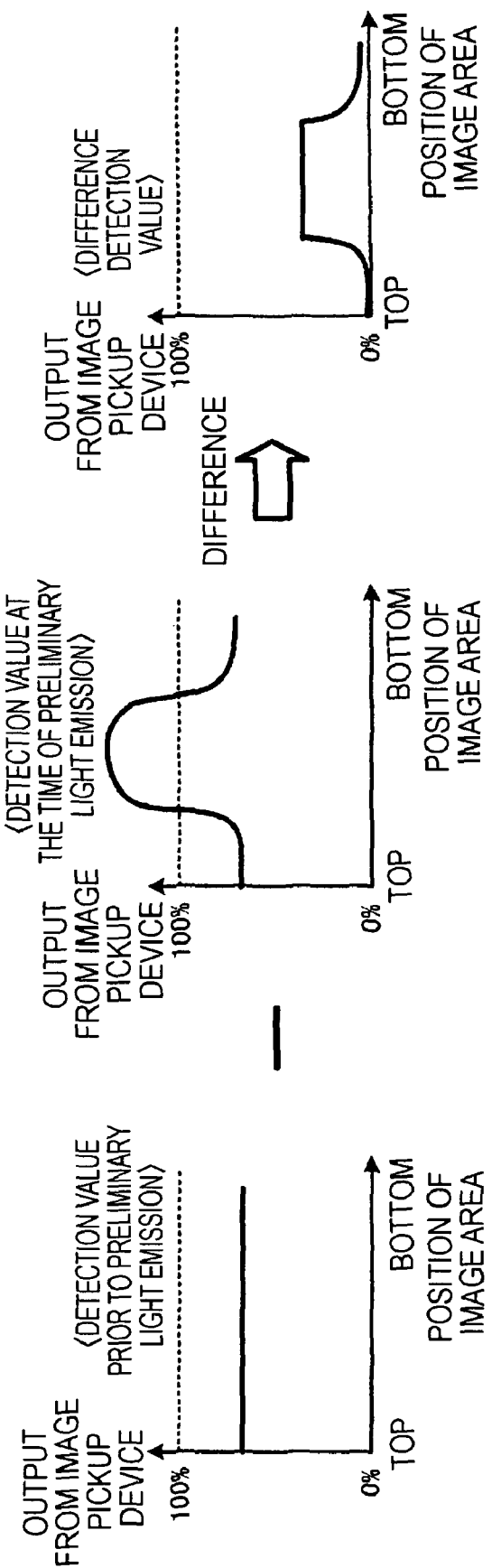
FIG. 9 is a diagram showing an exemplary computation of a difference detection value when there is external light.

FIG. 7 is a diagram showing an exemplary captured image. FIG. 8 is a diagram showing an exemplary computation of a difference detection value when there is no external light. FIG. 9 is a diagram showing an exemplary computation of a difference detection value when there is external light.

As shown in FIG. 7, it is assumed that flash photography is performed upon an image including a round image A in the center of the image area. Pixel signal outputs in the center line of the image area which is represented by a vertical dotted line, that is, the computation result of a difference detection value acquired from detection values will be described with reference to FIGS. 8 and 9.

As shown in FIG. 8, when there is no external light, the output value of the image pickup device 13 is zero before preliminary light emission. That is, the detection value prior to preliminary light emission D1 is also zero. At the time of preliminary light emission, the detection value at the time of preliminary light emission D2 in which the values of outputs from a part corresponding to the image A are large is acquired. Consequently, a difference detection value that is the difference between the detection value prior to preliminary light emission D1 and the detection value at the time of preliminary light emission D2 matches the detection value at the time of preliminary light emission D2.

On the other hand, as shown in FIG. 9, when there is external light, the detection value prior to preliminary light emission D1 corresponding to the amount of external light is acquired before preliminary light emission. At the time of preliminary light emission, light including the external light and light caused by the preliminary light emission is input into the image pickup device 13. At that time, a portion of the components of signals output from the image pickup device 13 (components of brightness signals) exceeds the dynamic range of the image pickup device 13. The portion that exceeds the dynamic range is clipped, and therefore a difference detection value excluding the clipped portion becomes smaller and is distorted. Accordingly, the amount of light required for main light emission cannot be accurately computed. As described previously, flash photography is rarely performed without external light. Accordingly, a time taken to perform the exposure operation prior to preliminary light emission and a time taken to perform the exposure operation at the time of preliminary light emission are required to be shortened so as to reduce the effect of external light and prevent the dynamic range of the image pickup device 13 from being degraded.

Next, the timing of preliminary light emission for flash photography will be described. First, known flash photography will be described.

Figure 10:
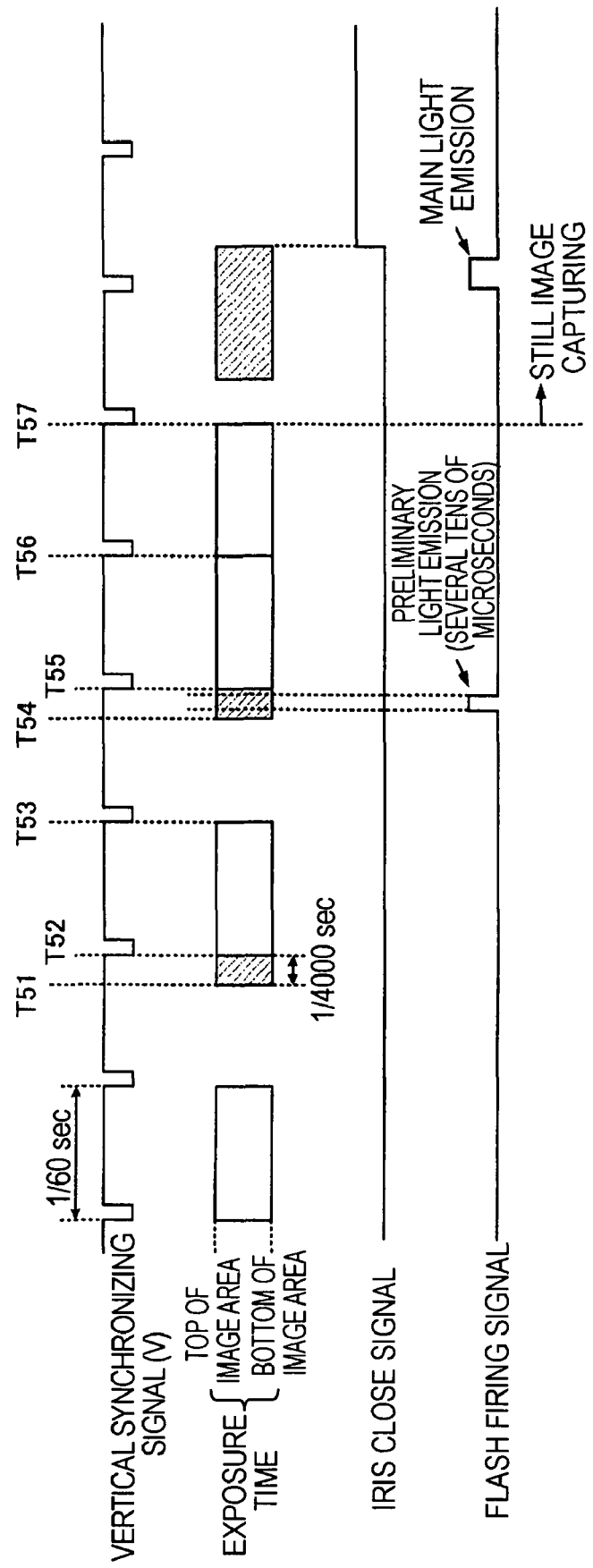
FIG. 10 is a diagram showing an exemplary flash photography sequence performed by a known CCD image sensor.

FIG. 10 is a diagram showing an exemplary flash photography sequence performed by a known CCD image sensor.

As shown in FIG. 10, if a CCD image sensor is used as the image pickup device 13, the exposure operation prior to preliminary light emission is started at a time T51. Signal electric charges received by light-receiving units are transferred to vertical transfer registers at a time T52. The transferred signal electric charges are sequentially read out during a period between the time T52 and a time T53, and then the detection value prior to preliminary light emission D1 is detected from the read out signal electric charges. Subsequently, the exposure operation at the time of preliminary light emission is performed during a period between a time T54 and a time T55. Signal electric charges are similarly read out during a period between the time T55 and a time T56, and then the detection value at the time of preliminary light emission D2 is detected. At that time, a difference detection value is computed on the basis of the detection value prior to preliminary light emission D1 and the detection value at the time of preliminary light emission D2, and then the amount of light required for main light emission is computed on the basis of the difference detection value. Subsequently, main light emission is performed at a predetermined timing after a time T57, whereby flash photography is performed. Thus, in the case of a CCD image sensor, all pixels are simultaneously exposed to light. Accordingly, the effect of preliminary light emission caused by the exposure operation at the time of preliminary light emission is equally applied to the whole area of an image.

Figure 11:
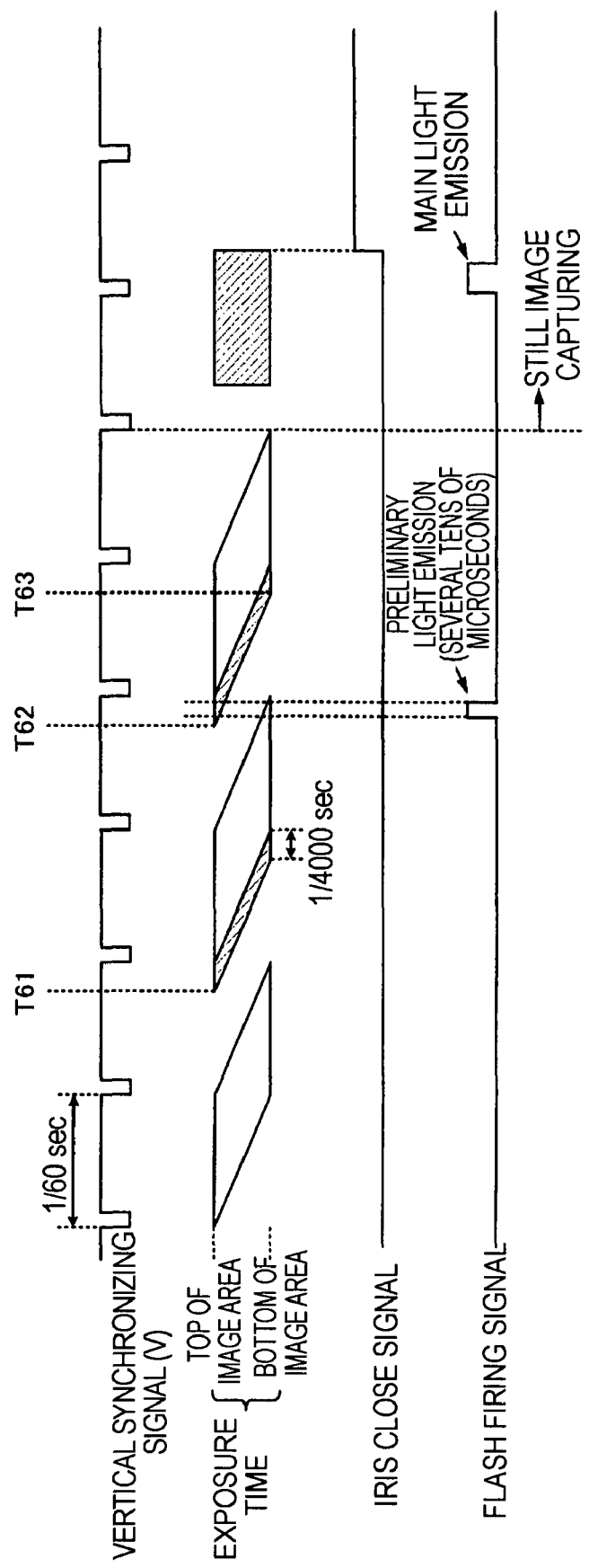
FIG. 11 is a diagram showing an exemplary flash photography sequence performed by a known CMOS image sensor.
Figure 12:
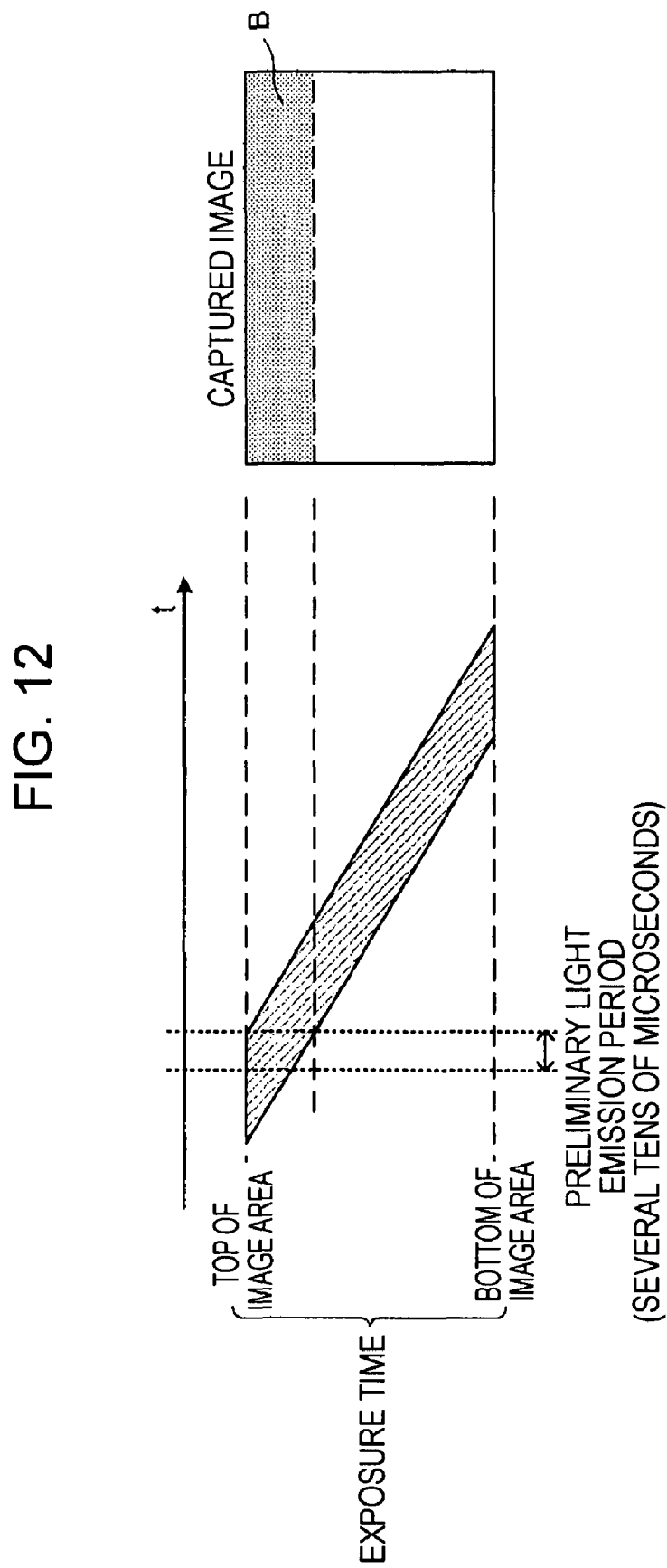
FIG. 12 is a diagram describing an image acquired by the known CMOS image sensor at the time of preliminary light emission.

On the other hand, FIG. 11 is a diagram showing an exemplary flash photography sequence performed by a known CMOS image sensor. FIG. 12 is a diagram describing an image acquired by the known CMOS image sensor at the time of preliminary light emission.

As shown in FIG. 11, if a known CMOS image sensor is used as the image pickup device 13, the exposure operation prior to preliminary light emission is started at a time T61. The exposure operation at the time of preliminary light emission is started at a time T62. At both of the times T61 and T62, detection values are individually acquired, and then difference detection value is computed. As described previously, in a CMOS image sensor, an exposure timing is shifted row by row from the top row in the upper portion of an image area to the last row in the lower portion thereof. For example, at the time of preliminary light emission, the exposure operation of the top row is started at the time T62, but the exposure operation of the last row is started at a subsequent time T63. In addition, the period of the preliminary light emission is short, for example, several tens of microseconds, and therefore, reflected light caused by the preliminary light emission cannot be received by all pixels included in the image area. For example, if preliminary light emission is performed as shown in FIG. 12, the effect of preliminary light emission caused by the exposure operation at the time of preliminary light emission is applied to only an area B that is a part of an image area (the upper portion of an image area shown in FIG. 12). Accordingly, a detection value acquired when there is only external light, which does not include the effect of the preliminary light emission, is merely acquired from the remaining area. That is, the detection value at the time of preliminary light emission cannot be accurately acquired, and therefore, the amount of light required for main light emission cannot be accurately computed.

Figure 13:
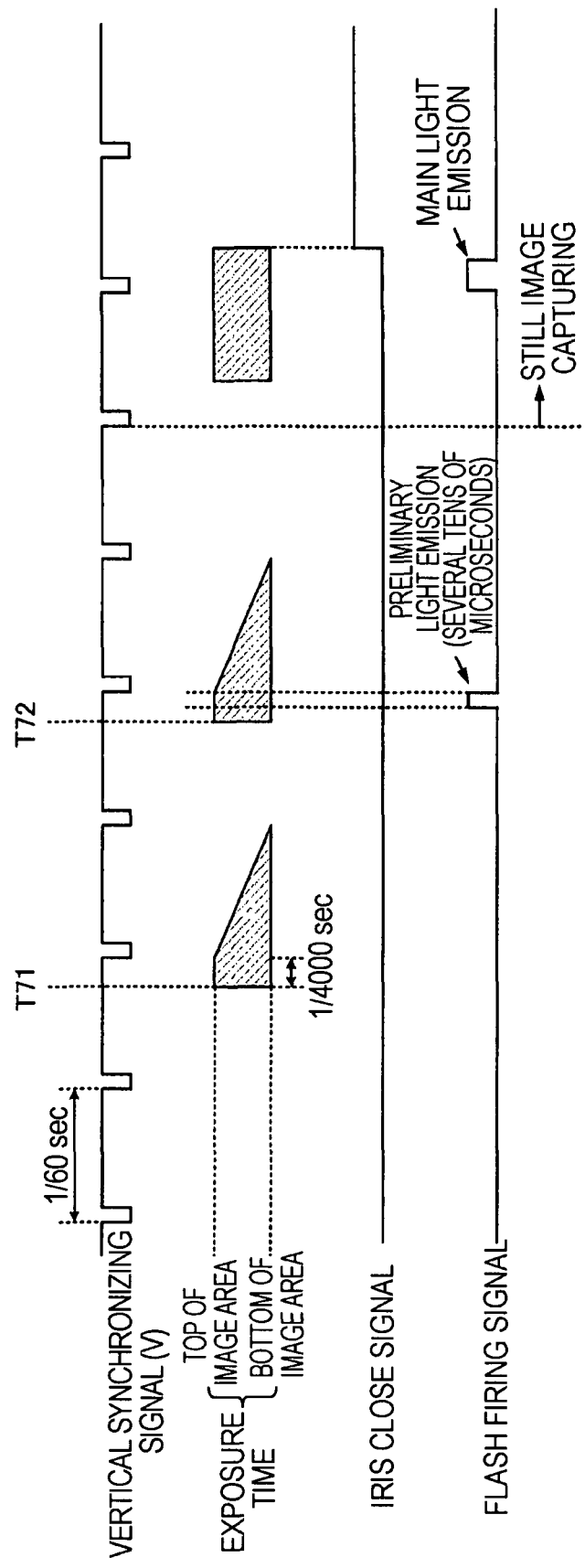
FIG. 13 is a diagram showing another exemplary flash photography sequence performed by a known CMOS image sensor.

In order to overcome this difficulty, as shown in FIG. 13, a method of removing electric charges included in all pixels at once before the exposure operation at the time of preliminary light emission is started is considered.

Figure 14:
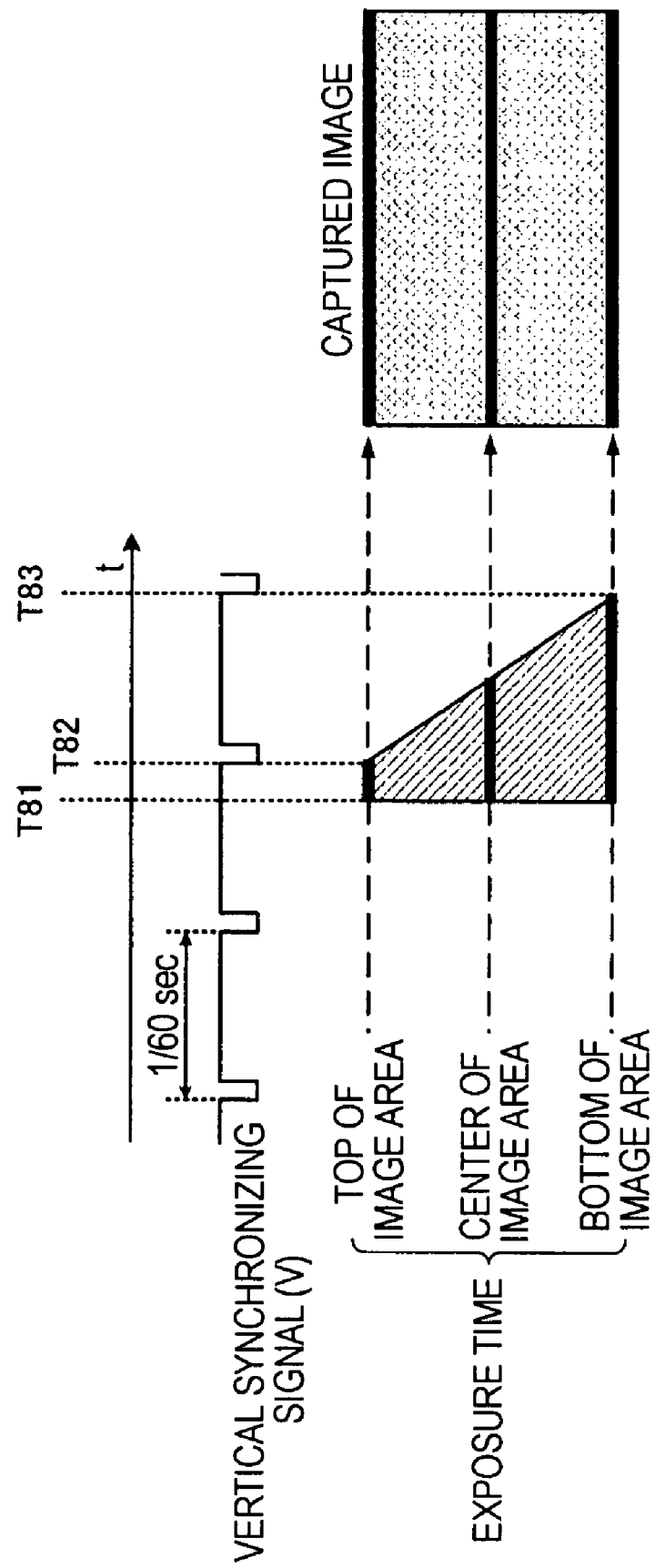
FIG. 14 is a diagram describing an image acquired at the time of preliminary light emission by using the flash photography sequence shown in FIG. 13.

FIG. 13 is a diagram showing another exemplary flash photography sequence performed by a known CMOS image sensor. FIG. 14 is a diagram describing an image acquired by the known CMOS image sensor at the time of preliminary light emission.

As shown in FIG. 13, before the exposure operation prior to preliminary light emission is started (at a time T71) and before the exposure operation at the time of preliminary light emission is started (at a time T72), electric charges acquired by all pixels included in the image pickup device 13 are removed so that the exposure operations of all the pixels included in an image area can be simultaneously started. Consequently, the effect of preliminary light emission caused by the exposure operation at the time of preliminary light emission is equally applied from the upper portion of the image area to the lower portion thereof, and therefore, a detection value can be accurately acquired at the time of preliminary light emission. In addition, since an exposure period immediately before the preliminary light emission is shortened, even if external light is strong, pixel signals included in at least the upper portion of the image area can be prevented from exceeding the dynamic range of the image pickup device 13.

However, pixel signals cannot be simultaneously read out from all the pixels included in the image area. A pixel signal read-out timing is shifted row by row. Accordingly, the exposure period of pixels included in a lower row is longer than that of pixels included in an upper row when the exposure operations prior to and at the time of preliminary light emission are performed. For example, as shown in FIG. 14, if all pixel signals are read out during a single vertical synchronization period between a time T81 and a time T83, the exposure period (between the time T81 and a time T82) of pixels included in the top row in the upper portion of the image area is the shortest (for example, approximately $\frac{1}{4000}$ second), and the exposure period (between the time T81 and the time T83) of pixels included in the last row is the longest (for example, approximately several hundredths of a second).

Here, it is assumed that a time taken to read out electric charges from all pixels is a single vertical synchronization period as shown in FIG. 14, and the whole image area of a subject equally receives external light. A case in which the image of such a subject is captured will be considered. FIG. 15 is a graph showing an example of detection of the detection value prior to preliminary light emission D1 in this case.

FIG. 15(A) shows a detection value acquired when the image of a subject is captured, the subject allowing the output value of a signal output from the image pickup device 13 to achieve 50 percent of the dynamic range of the image pickup device 13 when an exposure operation is performed during only one half of a vertical synchronization period. The exposure period of a pixel included in a lower row is longer. In this case, the output value of a pixel signal included in the center row of an image area achieves approximately 50 percent of the dynamic range, and the output value of a pixel signal included in the last row in the lower portion of the image area achieves approximately 100 percent of the dynamic range.

FIG. 15(B) shows a case in which the image of a subject is captured, the subject allowing the output value of a signal output from the image pickup device 13 to achieve 50 percent of the dynamic range of the image pickup device 13 when an exposure operation is performed during only one quarter of a vertical synchronization period. In this case, the output value of a pixel signal included in the center row of an image area achieves approximately 100 percent of the dynamic range, and the output values of pixels included in rows lower than the center row exceed the dynamic range. Accordingly, a suitable amount of external light cannot be detected.

Figure 16:
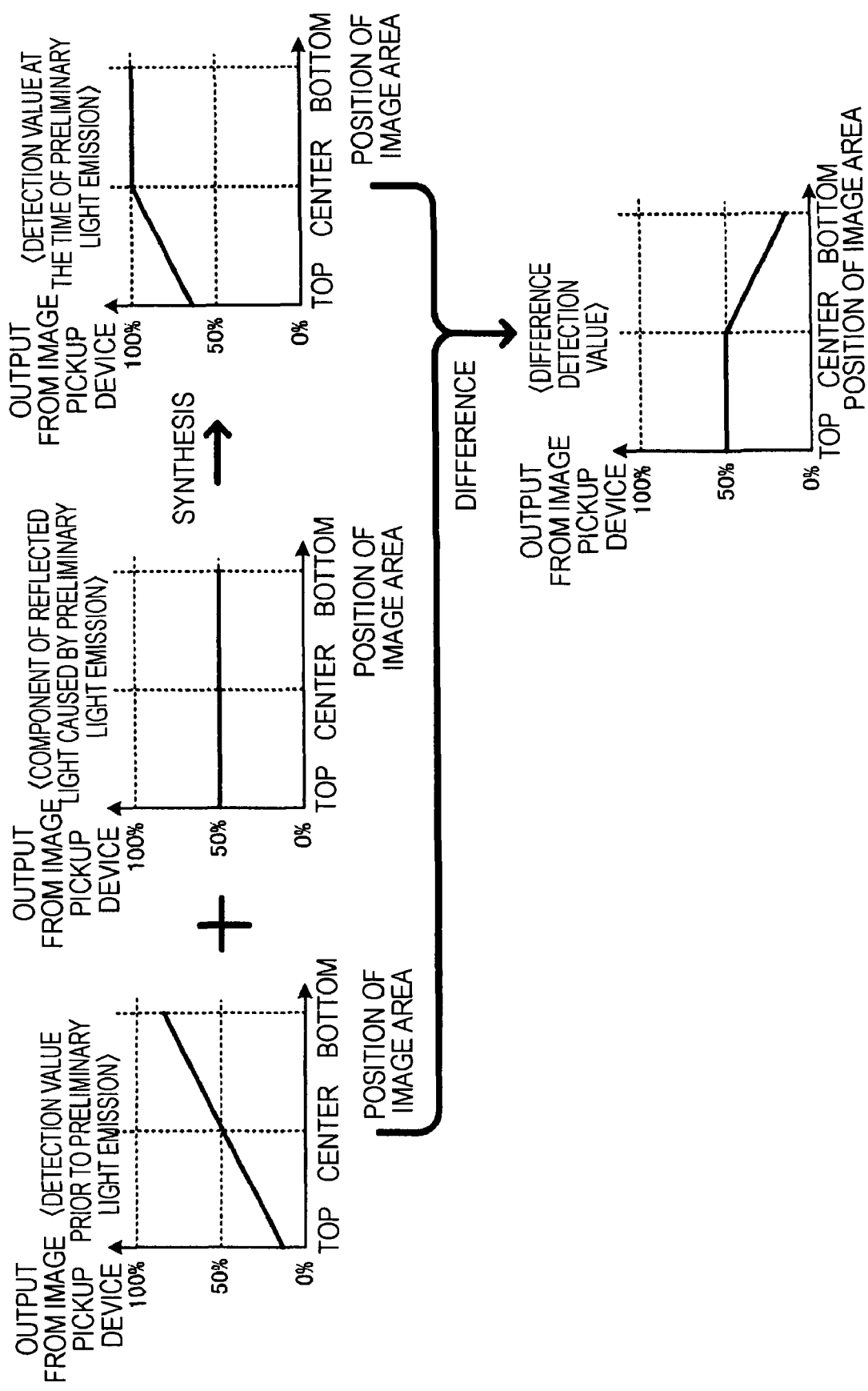
FIG. 16 is a diagram showing an exemplary computation of a difference detection value when pixel signals included in the lower portion of an image area are clipped.

FIG. 16 is a diagram showing an exemplary computation of a difference detection value when pixel signals included in the lower portion of an image area are clipped.

In the example of FIG. 16, there is external light allowing the output value of a pixel signal included in the top row of the image pickup device 13 to achieve approximately 20 percent of the dynamic range of the image pickup device 13 when the read-out operation of the top row is started. In this case, the output value of a pixel signal included in the last row achieves approximately 80 percent of the dynamic range when the read-out operation of the last row is performed. The amount of reflected light caused by preliminary light emission (including no external light component) is set to approximately 50 percent of the dynamic range of the image pickup device 13. Here, it is assumed that the whole area of an image area equally receives the reflected light caused by the preliminary light emission.

In such a case, the value of a synthesis of the component of external light and the component of reflected light caused by the preliminary light emission (the detection value at the time of preliminary light emission D2) is detected at the time of the preliminary light emission. Accordingly, the output values of pixel signals included in rows lower than a center row exceed the dynamic range, and then the detection value thereof is clipped. Consequently, in a graph representing a difference detection value that is the difference between the detection value at the time of preliminary light emission D2 and the detection value prior to preliminary light emission D1, the amount of reflected light actually caused by the preliminary light emission does not appear in an area in which the detection value is clipped. Thus, the amount of light required for main light emission cannot be accurately acquired only by causing all pixels to be simultaneously exposed to light.

In order to overcome the above-described difficulty, in this embodiment, electric charges are transferred from the light-receiving units 41 to the column 42 thinning out pixels so as to shorten the pixel signal read-out time of a whole image area, whereby the effect of external light applied to the computation of the amount of light required for main light emission can be reduced.

FIG. 17 is a diagram showing an exemplary intermittent pixel signal read-out method according to this embodiment which is used for the exposure operation prior to preliminary light emission and the exposure operation at the time of preliminary light emission.

In FIG. 17(A), a case in which one out of every n pixel signals is vertically and horizontally selected from among pixel signals included in the light-receiving units 41 of the image pickup device 13, and the selected pixel signals are intermittently read out is shown as an example of the intermittent read-out method. At that time, the electric charge of one out of every n pixels (n=4 in this drawing) is intermittently transferred from each column of the light-receiving units 41 to the column 42, and the transferred electric charge is output from the column 42. If the positions of pixels to be read out are shifted one by one and row by row as shown in FIG. 17(A), an electric charge is read out from consecutive pixels in an oblique direction as shown in FIG. 17(B). That is, a signal electric charge is read out from 1/n pixels (one-quarter in this example) of all pixels.

Figure 18:
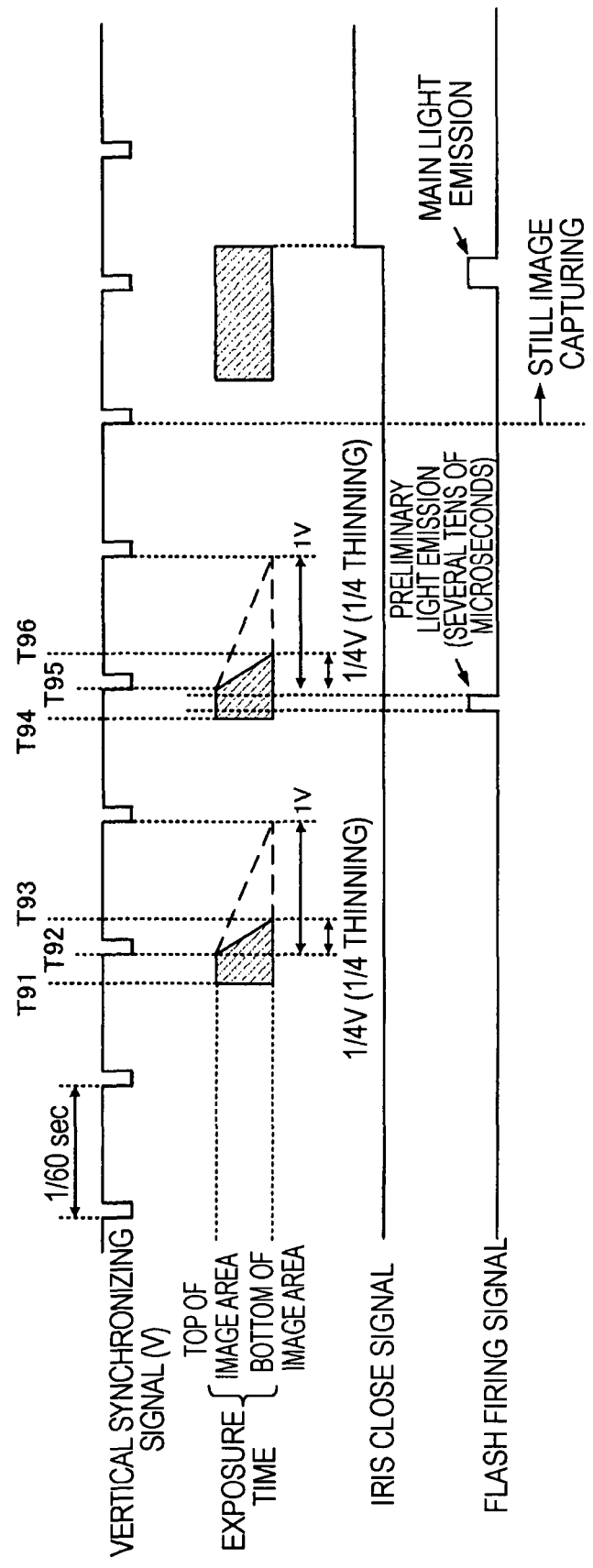
FIG. 18 is a diagram showing a flash photography sequence performed by a CMOS image sensor according to an embodiment.

FIG. 18 is a diagram showing a flash photography sequence performed by a CMOS image sensor according to this embodiment.

In FIG. 18, like FIGS. 11 and 13, a case in which a time taken to read out the electric charges of all pixels is a single vertical synchronization period is shown. In this case, if one out of every four pixel signals is intermittently read out as shown in FIG. 17, the read-out time of a whole image area is shortened by one quarter. In FIG. 18, when the exposure operation prior to preliminary light emission is performed, the electric charges of all the pixels included in the image pickup device 13 are removed at a time T91, and then the exposure operations of all the pixels are simultaneously started. Subsequently, an electric charge read-out operation is started from the top row in the upper portion of the image area at a time T92. Subsequently, after one quarter of a vertical synchronization period has elapsed, the electric charge read-out operation of the whole image area is completed (at a time T93). When the exposure operation at the time of preliminary light emission is performed, the electric charges of all the pixels are removed at a time T94, and then the exposure operations of all the pixels are simultaneously started. Subsequently, the preliminary light emission of the flash 21 is performed before a time T95 at which the electric charge read-out operation is to be started. At a time T96, one quarter of a vertical synchronization period after the electric charge read-out operation was started from the top row, the electric charge read-out operation of the whole image area is completed.

Figure 19:
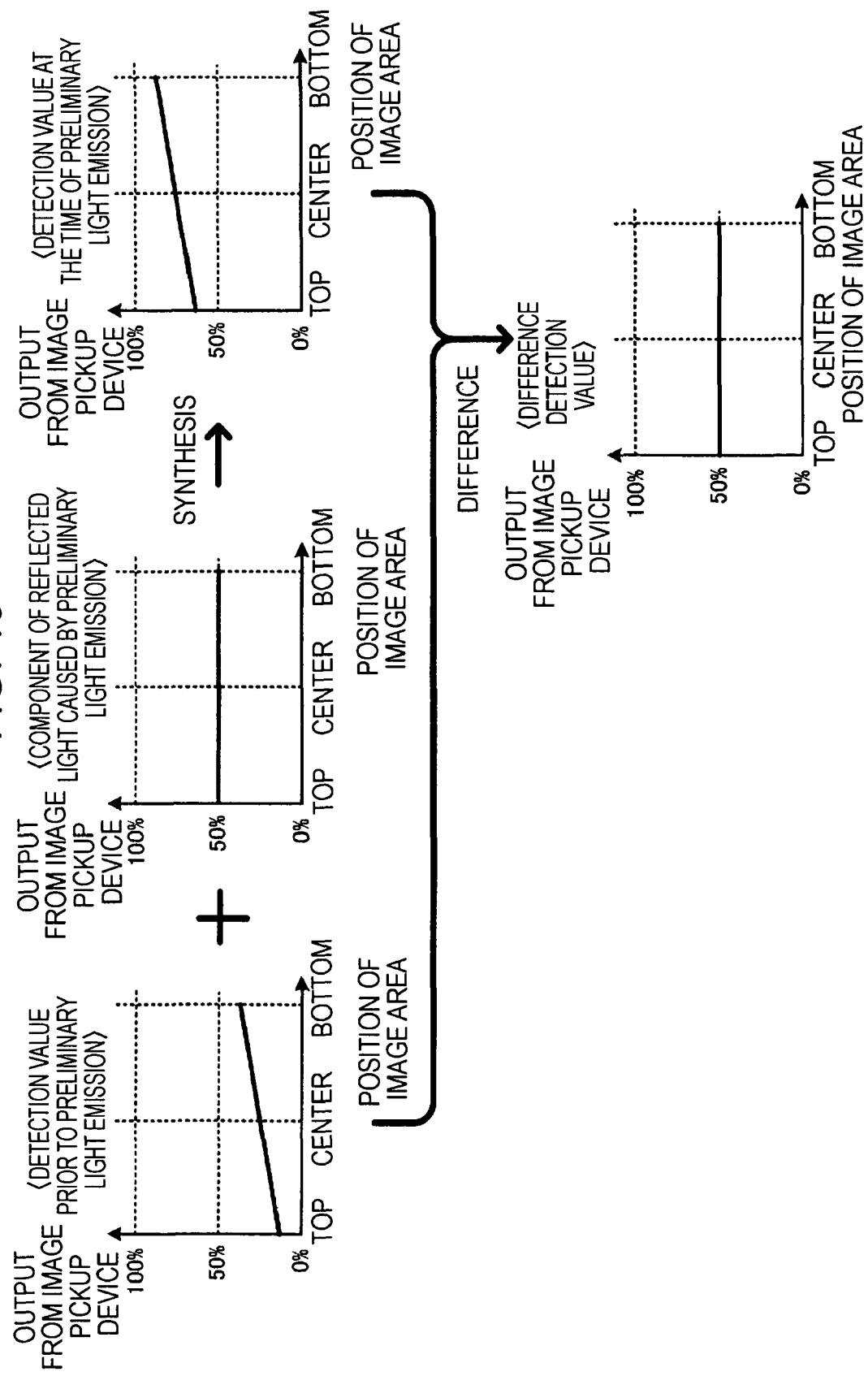
FIG. 19 is a diagram showing an exemplary computation of a difference detection value according to an embodiment.

FIG. 19 is a diagram showing an exemplary computation of a difference detection value according to this embodiment.

FIG. 19 shows exemplary detection performed under conditions of the amounts of external light and reflected light caused by preliminary light emission the same as those shown in FIG. 16. In the exposure operation prior to preliminary light emission shown in FIG. 16, the level of a pixel signal exceeds 50 percent of the dynamic range of the image pickup device 13 while electric charges are sequentially read out from the top row to the last row. However, in FIG. 19, the levels of pixel signals included in all rows are equal to or less than 50 percent of the dynamic range, since the electric charge read-out time is shortened by one quarter, and, in addition, the rate of increase of the detection value from the top row to the last row is decreased by one quarter. Accordingly, no signals output from the image pickup device 13 exceed the dynamic range of the image pickup device 13 even when the exposure operation at the time of preliminary light emission is performed and clipping does not therefore occur. Consequently, the difference detection value that is the difference between the detection value at the time of preliminary light emission D2 and the detection value prior to preliminary light emission D1 is equal to the component of reflected light caused by preliminary light emission, that is, an accurate difference detection value can be detected. Consequently, the amount of light of the flash required for main light emission can be accurately computed.

In FIG. 18, since the output of the image pickup device 13 is performed every two vertical synchronizing signal cycles during a period between the operation prior to preliminary light emission and the operation at the time of preliminary light emission which are performed by the image pickup device 13, the image signal output is temporarily stopped. In addition, since the pixel signals included in the image area are intermittently read out, distorted images are output. Accordingly, it is desirable that image signals output several vertical synchronizing signal cycles before the above-described period be stored in the memory 23 in advance, and the stored image signals be output to the subsequent display unit instead of image signals acquired by the image pickup device 13 when the image pickup device 13 starts the exposure operation prior to preliminary light emission. Consequently, the distorted image can be prevented from being recognized by a user.

FIG. 20 is a diagram showing another exemplary intermittent pixel signal read-out method according to this embodiment which is used for the exposure operation prior to preliminary light emission and the exposure operation at the time of preliminary light emission.

FIG. 20 shows a case in which one out of every n rows (n=4 in this drawing) is selected in each column from among pixel signals included in the light-receiving units 41 of the image pickup device 13, and the selected pixel signals are intermittently read out. In this case, like the case shown in FIG. 17, since electric charges are read out from only 1/n of all pixels, the electric charge read-out time of the whole image area is shortened by 1/n. Accordingly, the amount of light of the flash required for main light emission can be more accurately computed. In this example, since pixel read-out positions are the same in all columns, the circuit configuration of the image pickup device 13 for the electric charge read-out operation can be simplified. As another example, an electric charge may be read out from one out of every n columns in each row.

As described previously, in an image pickup apparatus according to this embodiment, when the preliminary light emission of the flash is performed, the exposure operations of all pixels included in the image pickup device 13 are simultaneously started, and, in addition, detection is performed by intermittently reading out an electric charge from one out of every n pixels. Accordingly, the time taken to expose the whole image area of the image pickup device 13 can be shortened, and the effect of the preliminary light emission can be applied to the whole image area of the image pickup device 13. Even if the amount of external light is relatively large, the amount of light received by the image pickup device 13 rarely exceeds the dynamic range thereof. Accordingly, the accuracy of a detection value can be improved, and the amount of light required for main light emission can be therefore more accurately computed.

Furthermore, a detection value prior to the preliminary light emission is detected in addition to a detection value at the time of preliminary light emission. By subtracting the detection value prior to preliminary light emission from the detection value at the time of preliminary light emission, a difference detection value including only the amount of light caused by the preliminary light emission except for the amount of external light can be acquired. Accordingly, the amount of light required for main light emission can be more accurately computed.

Here, a pixel thinning rate (n) may be changed in accordance with the amount of external light detected when the detection prior to preliminary light emission or the detection at the time of preliminary light emission is performed. For example, the electric charge read-out time of the whole image area is shortened by increasing the pixel thinning rate (n). Accordingly, the rate of increase of a detection value, which is changed in accordance with the position of a pixel in an image area, is more decreased in the detection value prior to preliminary light emission D1. That is, when the amount of external light is large, the portion of the detection value can be prevented from being clipped with certainty by increasing the pixel thinning rate (n).

Furthermore, if an image pickup apparatus has a zoom function achieved by lens movement, the pixel thinning rate (n) may be changed in accordance with a focal length. The reason is that, when a zoom factor is increased, the amount of light required for main light emission can be accurately computed even if the number of pixels to be detected is more decreased compared with a case in which the zoom factor is low according to a subject toward which a flash is to be fired.

Figure 21:
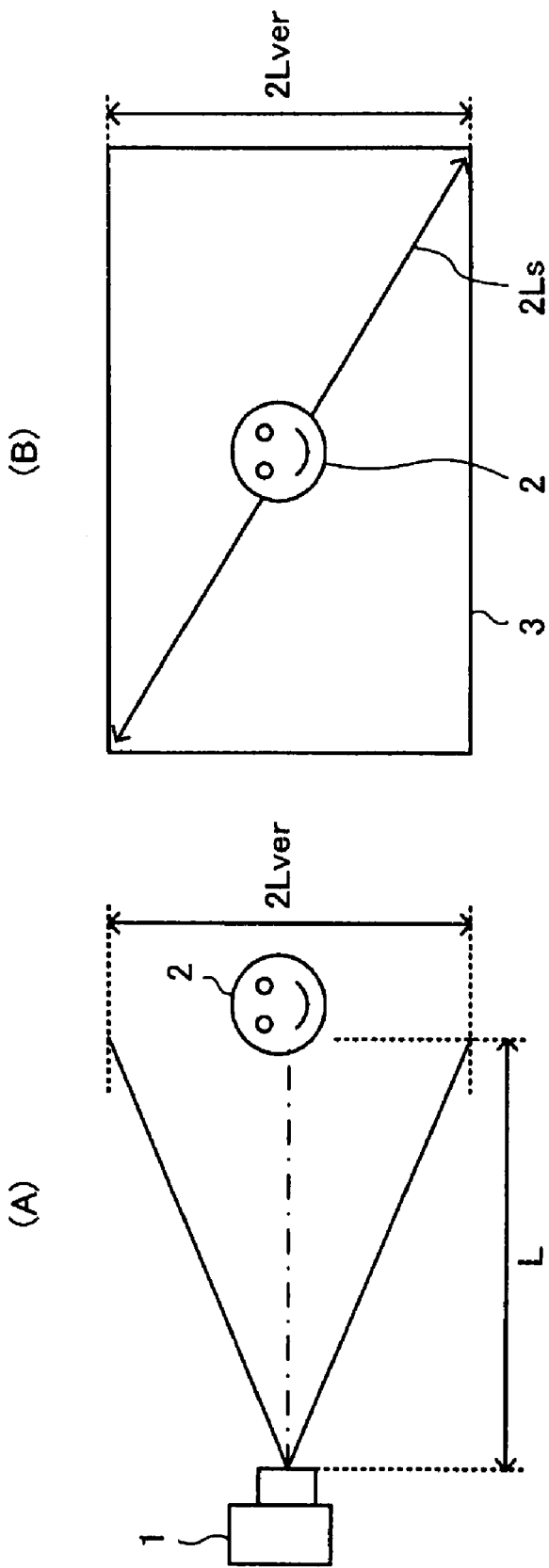
FIG. 21 is a diagram describing a relationship between a focal length and a field angle.
Figure 22:
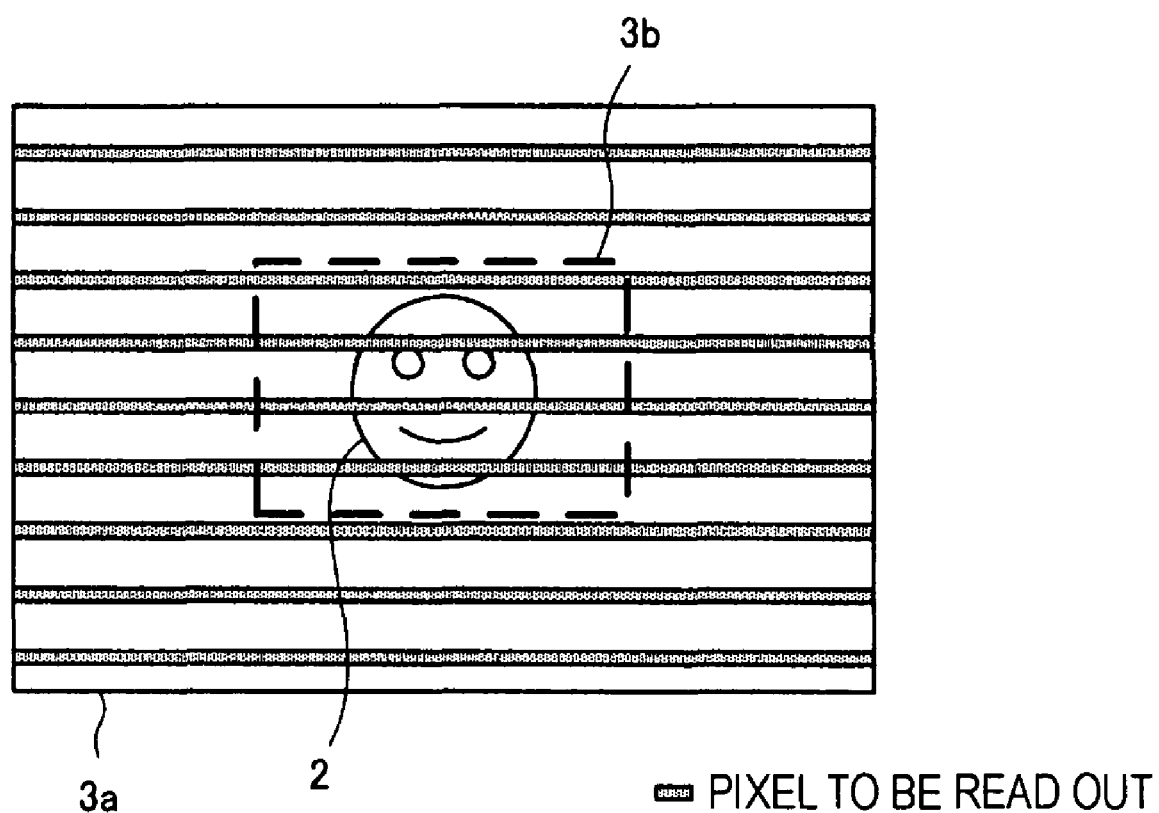
FIG. 22 is a diagram describing a relationship between a focal length and a pixel thinning rate.

FIG. 21 is a diagram describing a relationship between a focal length and a field angle. FIG. 22 is a diagram describing a relationship between a focal length and a pixel thinning rate.

Here, a human face is assumed as a subject 2. In FIG. 21(A), a distance between the image pickup plane of an image pickup apparatus 1 and the subject 2 is defined as L, and a vertical image pickup range is defined as 2Lver. In FIG. 21(B), the diagonal distance of an image pickup range 3 is defined as 2Ls. When a focal length f is 38 mm (35 mm photography equivalent), a field angle $2\omega$ is approximately 60°. If an angle $\theta$ formed between the lateral direction and diagonal direction of the image pickup range 3 is 37°, and this value is substituted into the following equations Ls=L*tan $\theta$ and Lver=Ls*sin $\theta$, the vertical distance 2Ls of the image pickup range 3 becomes 0.7 L. Thus, an image pickup range can be calculated on the basis of the focal length f. When the subject 2 exists within the distance L within which the light of a flash can be transferred from the image pickup apparatus 1, an area occupied by the image of the subject 2 in the image area of the image pickup apparatus 1 can be computed.

Here, for example, as shown in FIG. 22, pixel signals are intermittently read out every predetermined number of rows (n). At that time, when the image of the subject 2 is captured within an image pickup range 3a, for example, it is assumed that nine rows are required to be read out in a whole image area as shown in FIG. 22. If a focal length is increased in this state, the image of the subject 2 is zoomed within an image pickup range 3b. When the exposure operation at the time of preliminary light emission for flash photography is performed, if reflected light caused by the preliminary light emission can be received from a subject (here, a human face is assumed), the amount of light required for main light emission can be accurately computed. Accordingly, if light corresponding to only three rows reflected from the face of the subject 2 is detected within the image pickup range 3a, the nine rows within the image pickup range 3b are not required to be detected therein. That is, by detecting only three rows on the subject 2, the same computation accuracy as that acquired within the image pickup range 3a can be acquired.

As an example, if n=16 and the total number of rows of the image pickup device 13 is 500, a pixel area upon which the intermittent read-out operation is to be performed covers approximately 3 percent of the whole image area. If the distance L between the image pickup device 13 and the subject 2 is 2.5 m, the component of reflected light is read out at approximately 5 cm intervals on the subject 2. If the distance between a chin and forehead is 20 cm, about three or four rows are detected on a human face. If n=4, the component of reflected light is similarly read out at approximately 1 cm intervals on the subject 2.

Thus, the thinning rate (n) can be decided on the basis of the number of rows of the image pickup device 13, the focal length f, and the assumed size of a subject (here, a vertical length). Accordingly, for example, the thinning rate (n) at a wide angle end is set for each operation mode such as a portrait mode in advance. When the focal length f is increased in flash photography (i.e., a zoom factor is increased), the thinning rate (n) is caused to be increased, whereby the exposure time at the time of preliminary light emission can be shortened, and the computation accuracy of the amount of light required for main light emission can be enhanced.

An embodiment of the present invention can be applied to not only an image pickup apparatus such as a digital still camera or a digital video camera that has a still image pickup function but also a mobile telephone, a PDA (Personal Digital Assistant), etc. which have the same function.

In addition, an embodiment of the present invention can be applied to an information processing apparatus (computer) such as a personal computer capable of receiving an captured image by controlling the image pickup operations of an image pickup device and a flash which are externally connected thereto. In this case, a program in which the details of processing functions required for the above-described image pickup apparatus are written is provided for the computer. Subsequently, the computer executes the program, whereby the above-described processing functions can be achieved in the computer. The program in which the details of the processing functions are written may be stored on a computer readable recording medium. The computer readable recording medium may be a magnetic recorder, an optical disc, a magneto-optical disk, or a semiconductor memory.

If the program is distributed, for example, portable recording media with the program recorded thereon, such as an optical disc, are sold. Also, the program may be stored in the storage unit of a server computer, and may be transmitted via a network from the server computer to other computers.

The computer executing the program, for example, stores the program stored in the portable recording medium or transmitted from the server computer in its own storage unit. The computer reads out the program from its own storage unit and performs processing in accordance with the program. The computer may read out the program directly from the portable recording medium to perform processing in accordance with the program. The computer may perform processing in accordance with the received program every time the program is transmitted from the server computer.

INDUSTRIAL APPLICABILITY

According to an embodiment of the present invention, when the preliminary light emission of a flash is performed, after the exposure operations of all pixels included in a solid-state image pickup device have been simultaneously started, the pixel signals of individual pixels are intermittently read out at predetermined pixel intervals. Consequently, the effect of the preliminary light emission is applied to the whole image area of the solid-state image pickup device. In addition, since the exposure time of the solid-state image pickup device is shortened at the time of the preliminary light emission, the detected amount of the component of external light is decreased. Accordingly, even if external light is relatively strong, the amount of light detected at the time of the preliminary light emission rarely exceeds the dynamic range of the solid-state image pickup device. Therefore, the amount of the component of reflected light caused by the preliminary light emission can be accurately detected, and the accuracy of the computation of the amount of light required for main light emission can be improved, whereby a higher-quality image can be obtained.

The invention claimed is:

1. An image pickup apparatus for capturing an image using a solid-state image pickup device in which the pixel signals of individual pixels can be randomly accessed, the image pickup apparatus comprising:
   a flash for exposing a subject to light;
   detecting means for detecting the brightness level of a captured image from an image signal obtained by the solid-state image pickup device; and
   controlling means for causing the flash to perform preliminary light emission prior to the main light emission of the flash, causing the solid-state image pickup device to capture an image at the time of the preliminary light emission, causing the detecting means to detect the brightness level of the image captured at the time of the preliminary light emission on the basis of the signal of the captured image, and computing the amount of light required for the main light emission of the flash on the basis of the detected brightness level at the time of the preliminary light emission,
   wherein, the controlling means intermittently reads out the pixel signals of individual pixels at predetermined pixel intervals after causing the solid-state image pickup device to simultaneously start the exposure operations of all pixels included therein at the time of the preliminary light emission, and then transmits the read out pixel signals to the detecting means, and
   wherein, when the image capturing operation at the time of the preliminary light emission is performed, as an amount of external light becomes larger, the controlling means increases the pixel intervals at which the pixel signals are intermittently read out.

2. The image pickup apparatus according to claim 1,
   wherein the controlling means causes the solid-state image pickup device to capture an image without firing the flash immediately before the preliminary light emission, causes the detecting means to detect the brightness level of the image captured immediately before the preliminary light emission on the basis of the signal of the captured image, and computes the amount of light required for the main light emission of the flash on the basis of a difference value that is a difference between the brightness level detected immediately before the preliminary light emission and the brightness level detected at the time of the preliminary light emission, and
   wherein, when the solid-state image pickup device captures the image immediately before the preliminary light emission, the controlling means intermittently reads out the pixel signals of individual pixels at predetermined pixel intervals after causing the solid-state image pickup device to simultaneously start the exposure operations of all the pixels included in the solid-state image pickup device, and then transmits the read out pixel signals to the detecting means.

3. The image pickup apparatus according to claim 2, wherein, when the image capturing operations immediately before the preliminary light emission and at the time of the preliminary light emission are individually performed, the controlling means reads out the pixel signals included in the solid-state image pickup device in units of horizontal pixel rows.

4. The image pickup apparatus according to claim 2, wherein, when the image capturing operations immediately before the preliminary light emission and at the time of the preliminary light emission are individually performed, the controlling means reads out the pixel signals included in the solid-state image pickup device in units of vertical pixel columns.

5. The image pickup apparatus according to claim 2, wherein, when the image capturing operation immediately before the preliminary light emission is performed, as the amount of external light becomes larger, the controlling means increases the pixel intervals at which the pixel signals are intermittently read out from the solid-state image pickup device.

6. The image pickup apparatus according to claim 2,
   further comprising a zoom mechanism for capturing the enlarged image of a subject by moving a lens along an optical axis, and
   wherein, when the image capturing operations immediately before the preliminary light emission and at the time of the preliminary light emission are individually performed, as the focal length of the zoom mechanism becomes longer, the controlling means increases the pixel intervals at which the pixel signals are intermittently read out from the solid-state image pickup device.

7. The image pickup apparatus according to claim 2,
   further comprising storing means for storing information on an image captured by the solid-state image pickup device before the preliminary light emission is performed, and
   wherein, when the solid-state image pickup device starts the image capturing operation immediately before the preliminary light emission, the controlling means reads out the image information stored in the storing means instead of images captured in the image capturing operations performed immediately before the preliminary light emission and at the time of the preliminary light emission, and outputs the read out image information to a subsequent image display processing device.

8. The image pickup apparatus according to claim 1, wherein the solid-state image pickup device is configured with an XY address type image sensor.

9. The image pickup apparatus according to claim 8, wherein the XY address type image sensor is configured with a CMOS image sensor.

10. An image pickup method of capturing an image by firing a flash using a solid-sate image pickup device in which the pixel signals of individual pixels can be randomly accessed, the image pickup method comprising:
    an image capturing step at the time of preliminary light emission of causing the flash to perform preliminary light emission prior to the main light emission of the flash, and causing the solid-state image pickup device to capture an image at the time of the preliminary light emission;
    a detecting step at the time of preliminary light emission of causing detecting means to detect the brightness level of the image captured at the time of the preliminary light emission; and
    a computing step of causing computing means to compute the amount of light required for the main light emission of the flash on the basis of the brightness level detected at the time of the preliminary light emission,
    wherein, in the image capturing step at the time of preliminary light emission, after the exposure operations of all pixels included in the solid-state image pickup device have been simultaneously started, the pixel signals of individual pixels are intermittently read out at predetermined pixel intervals, and
    wherein, when the image capturing operation at the time of the preliminary light emission is performed, as an amount of external light becomes larger, the pixel intervals at which the pixel signals are intermittently read out are increased.

11. The image pickup method according to claim 10, further comprising:
an image capturing step prior to preliminary light emission of causing the solid-state image pickup device to capture an image without firing the flash before the image capturing step at the time of preliminary light emission; and
a detecting step prior to preliminary light emission of causing the detecting means to detect the brightness level of the image captured in the image capturing step prior to preliminary light emission on the basis of the signal of the captured image, and
wherein, in the image capturing step prior to preliminary light emission, after the exposure operations of all the pixels included in the solid-state image pickup device have been simultaneously started, the pixel signals of individual pixels are intermittently read out at predetermined pixel intervals, and
wherein, in the computing step, the amount of light required for the main light emission of the flash is computed on the basis of a difference value that is a difference between the brightness level detected in the detecting step prior to preliminary light emission and the brightness level detected in the detecting step at the time of preliminary light emission.

12. A non-transitory, computer-readable storage medium storing a program which, when executed by a processor, causes a computer to perform image pickup control processing for capturing an image by firing a flash using a solid-sate image pickup device in which the pixel signals of individual pixels can be randomly accessed, the processing comprising the steps of:
causing the flash to perform preliminary light emission prior to the main light emission of the flash, causing the solid-state image pickup device to capture an image at the time of the preliminary light emission, causing detecting means to detect the brightness level of the image captured at the time of the preliminary light emission on the basis of the signal of the captured image, and intermittently reading out the pixel signals of individual pixels at predetermined pixel intervals after causing the solid-state image pickup device to simultaneously start the exposure operations of all pixels included in the solid-state image pickup at the time of the preliminary light emission; and
computing the amount of light required for the main light emission of the flash on the basis of the brightness level detected by the detecting means at the time of the preliminary light emission,
wherein, when the image capturing operation at the time of the preliminary light emission is performed, as an amount of external light becomes larger, the pixel intervals at which the pixel signals are intermittently read out are increased.

13. The non-transitory, computer-readable storage medium according to claim 12, wherein the processing further includes the steps of:
causing the solid-state image pickup device to capture an image without firing the flash immediately before the preliminary light emission, and causing the detecting means to detect the brightness level of the image captured immediately before the preliminary light emission on the basis of the signal of the captured image,
wherein the computing of the amount of light required for the main light emission of the flash is based on a difference value that is a difference between the brightness levels detected by the detecting means immediately before the preliminary light emission and at the time of the preliminary light emission, and
wherein, when the solid-state image pickup device captures the image immediately before the preliminary light emission, the pixel signals of individual pixels are intermittently read out at predetermined pixel intervals after causing the solid-state image pickup device to simultaneously start the exposure operations of all the pixels included in the solid-state image pickup device.

* * * * *